United States Patent [19]
Kielland

[11] Patent Number: 6,081,206
[45] Date of Patent: Jun. 27, 2000

[54] PARKING REGULATION ENFORCEMENT SYSTEM

[75] Inventor: Peter J. Kielland, Ottawa, Canada

[73] Assignee: Visionary Technology Inc., Ontario, Canada

[21] Appl. No.: 09/036,159

[22] Filed: Mar. 6, 1998

[30] Foreign Application Priority Data

Mar. 14, 1997 [CA] Canada ................................ 2199999

[51] Int. Cl.⁷ .............................. G08G 1/017; B60Q 1/48
[52] U.S. Cl. ................... 340/937; 340/932.2; 340/425.5; 235/384; 194/902; 348/148; 348/159; 382/104; 705/13; 705/418
[58] Field of Search ................................ 340/937, 932.2, 340/425.5, 565, 556; 382/105, 104; 348/148, 149, 135, 143, 159; 235/384; 705/13, 418; 194/902, 900, 207

[56] References Cited

U.S. PATENT DOCUMENTS

| | | | |
|---|---|---|---|
| 4,817,166 | 3/1989 | Gonzalez et al. | 382/1 |
| 5,339,000 | 8/1994 | Bashan et al. | 340/932.2 |
| 5,343,237 | 8/1994 | Morimoto | 340/932.2 |

FOREIGN PATENT DOCUMENTS

| | | |
|---|---|---|
| 0 367 725 | 5/1990 | European Pat. Off. . |
| 2 226 904 | 11/1974 | France . |
| 44 01 993 | 7/1995 | Germany . |
| 08 242442 | 9/1996 | Japan . |
| 2 265 243 | 9/1993 | United Kingdom . |
| 2 279 478 | 1/1995 | United Kingdom . |
| 2 284 290 | 5/1995 | United Kingdom . |
| WO 94/08820 | 4/1994 | WIPO . |
| WO 97/14116 | 4/1997 | WIPO . |

*Primary Examiner*—Donnie L. Crosland
*Attorney, Agent, or Firm*—John S. Pratt; Edwina T. Washington; Kilpatrick Stockton LLP

[57] ABSTRACT

A video camera mounted on a parking enforcement patrol vehicle and connected to a computer near the operator. The system is driven along a patrol route where parked vehicles are governed by a posted time limit. The system enforces the local parking regulation by automatically determining whether or not each parked car has been parked longer than the posted time limit. Violations are detected by applying a License Plate Recognition algorithm to the images. Each license plate number is time-tagged, geo-referenced and entered into a local database. When the patrol vehicle re-traces the patrol route after the posted parking time limit has expired, the database is searched to flag vehicles that were observed at the same location during the previous circuit and therefore in violation of the parking regulations. When the system detects a parking violation, it prints a parking citation that the operator affixes to the offending parked vehicle.

42 Claims, 10 Drawing Sheets

PARKING REGULATION ENFORCEMENT SYSTEM

BACKGROUND OF THE INVENTION

1. Field of the invention

This invention relates to law enforcement and more particularly to an automated means for detecting vehicles that have been parked for longer than the legally prescribed period.

2. Background

Municipal governments enact regulations to govern the parking of cars along city streets. Typically, time limits are posted along each street and parking fines are levied on vehicle owners who park their cars for longer than the posted time. Two benefits result from the practice of making and enforcing on-street parking regulations:

1) Traffic congestion is reduced by forcing motorists parked for long periods to find suitable off-street parking arrangements, thereby vacating their more convenient, on-street parking spaces for use by motorists wishing to stop for short periods.
2) The parking fines levied on motorists who violate parking regulations create revenue the municipality.

In order to reap these benefits, the fundamental technical problem faced by Parking Authorities is how to detect when vehicles are in violation of the posted time limit. Heretofore, two violation-detection and enforcement technologies have been employed:

1) Parking meters
   2) Timed chalk-marking of car tires

Enforcement Using Parking Meters

Parking meters are timing devices installed adjacent to each parking space that the Parking Authority wishes to enforce. Once installed, parking meters permit motorists to rent each on-street parking space for short periods. To rent the space, the motorist must insert coins into the meter, thereby starting a timer mechanism that suppresses display of an "Illegally Parked" flag. When the purchased parking period has expired, the "Illegally Parked" flag is again made plainly visible, thereby enabling a Parking Enforcement Officer patrolling the area to see at a glance that the parking space is illegally occupied. The officer continually inspects every parking meter along the patrol route and issues citations to those cars that are illegally parked.

Detecting parking violations with parking meters is an effective means of enforcing regulations, particularly in areas with high traffic density such as downtown commercial districts. A significant advantage of using parking meters to detect infractions is that they also provide a means for collecting a "pay per use" rental fee. The requirement to insert coins provides a continual stream of revenue to the municipality, even if no vehicle is ever cited for an over-parking infraction. However, each parking space requires its own parking meter, which is an expensive piece of equipment to purchase and install. The capital costs of initiating a parking metered enforcement program are considerable. Since the Enforcement Officer must visually inspect each parking meter along the route, patrolling the meters is a tedious, labour intensive activity that adds to the overall cost of metered enforcement. In congested, downtown areas, officers are often obliged to patrol the route on foot, thereby adding to the labor cost of the system. Maintaining the meters in good working order and emptying their contents is another significant expense related to metered enforcement.

Enforcement Using Timed Chalk-Marking of Car Tires

The high cost of installing, maintaining and patrolling parking meters limits their cost-effectiveness in many on-street parking situations. In particular, low-density areas outside the downtown core may be considered "not profitable enough" to warrant the use of parking meters. In these areas, the other method of parking enforcement commonly employed is "timed chalk-marking of car tires" (hereafter referred to as "tire-chalking").

Parking regulation enforcement using the tire-chalking methodology is as follows:

1) A route is chosen such that all the parked cars along it are subject to the same parking regulation (e.g. 2-hour parking limit). The Officer patrols the route and stops beside every parked car that's encountered. Typically, the patrol is done using a car however foot and bicycle patrols are also common modes of transportation.
2) A temporary mark is made on one of each car's tires using a piece of chalk or similar marking utensil. In order that the officer can attest to having made the mark, some effort is made to keep all the marks similar in size, color, shape and placement.
3) At regular intervals along the route, the time is noted, thereby the enabling a time to be estimated for when each of the chalk-marks was made.
4) After all of the cars parked along the patrol route have been marked, the officer retraces the same route. Care is taken to regulate the speed of the patrol such that the officer returns to the location of each of the chalk-marks just after the permissible parking period has expired (e.g. if the posted time limit is two hours, then the officer must return to the same location slightly more than two hours after chalk marks were made at that location).
5) During the second trip over the patrol route, the officer visually inspects the tires of each and every vehicle looking for a chalk-mark made during the previous circuit. A found chalk-mark serves as evidence that the marked vehicle has not moved during the period the Officer has been away patrolling the rest of the circuit.
6) When a chalk-marked car (i.e. an illegally parked car) is sighted the officer issues it a parking citation. After writing the details of the infraction onto the citation and attaching it to the offending vehicle, the Officer continues along the route, slowing down or speeding up as necessary to stay on-schedule for detecting subsequent parking violations.

The chalk-mark method of detecting parking violations is commonly used along lightly traveled streets where metered enforcement would not be cost-effective. Since no capital investment in parking meters is required to provide infrastructure, a tire-chalking enforcement program is less costly to initiate than an enforcement program based on parking meters.

Furthermore, tire-chalking provides a more flexible means of parking enforcement. Patrol routes can be quickly adapted to suit the changing parking habits that generally occur at different times of the day, on different days of the week or in different seasons of the year; something that meters cannot easily accommodate.

While the capital cost of using chalk-marks as a means to enforce parking regulations is less than that of using parking meters, the labor cost of using chalk-mark detection is significantly higher. The principal factor contributing to the workload is the need to manually mark every car along the patrol route . . . a task that is both physically demanding and time consuming.

Furthermore, the route must be patrolled twice before any infractions can be detected whereas parking meters guide the Officer to infractions every time the route is patrolled. The high labour cost of first applying chalk-marks and then searching for them significantly reduces this methodology's attractiveness as a parking enforcement means. Furthermore, the second traverse of the patrol route is often dedicated only to inspecting tires and issuing citations, thereby permitting newly parked vehicles to go unmarked.

Furthermore, detection and prosecution is based entirely on the presence of chalk-marks on each vehicle. Vehicle owners can evade prosecution simply by hiding the mark. Typically, each tire is marked on its tread surface so simply moving the car a few feet within the parking space will rotate it away from the officer's view, thereby making it impossible to detect the infraction during the second traverse of the patrol route. If the chalk-mark has been made on the side of the tire rather than on its tread, the mark can still be easily rubbed off to evade detection.

Regardless of whether parking regulations are enforced using parking meters or tire-chalking, once a parking infraction is detected, creating a legal citation and serving it on the vehicle's owner takes a considerable amount of time and effort. The main factor contributing to this workload is the requirement for the officer to write down all the details of the infraction by hand onto a paper citation form before affixing it to the offending vehicle (time, location, license plate number, nature of infraction etc). Furthermore, the labour cost of processing each parking citation is increased by the requirement to transcribe the hand-written data into a computerized system that tracks the infraction through the court system.

Another factor that degrades the performance of both enforcement systems is their incapacity to detect "scofflaw" motorists. "Scofflaw" is the term commonly used by Parking Authorities for a motorist who flouts parking regulations. Scofflaws flout parking regulations by discarding or otherwise ignoring all parking citations they receive. Neither the parking meter enforcement methodology nor the tire-chalking enforcement methodologies can detect whether or not the vehicle's owner is likely to pay the fine levied for the infraction. Since many of the citations written by officers are ignored by scofflaw motorists, the inability of both the meter and chalk-mark enforcement methodologies to deal effectively with scofflaw motorists reduces their fiscal efficiency.

It is therefore the purpose of the present invention to provide a means of enforcing parking regulations that eliminates the drawbacks inherent to using either parking meters or tire-chalking.

LPR Technical Background

The present invention exploits "Optical Character Recognition". OCR image analysis is a well-established technology that has many applications in the publishing and archiving industry. Essentially, OCR is an image analysis process that converts a raster-scanned image of printed characters into machine readable ASCII codes, thereby eliminating the need to re-type old documents into a computer and rendering them amenable to automated processing.

One common application of OCR technology is to digitize a vehicle's license plate number from its raster image. When applied to vehicular imagery, OCR technology is commonly referred to as "License Plate Recognition" (LPR). Heretofore, LPR has been applied to stationary law enforcement and security applications (e.g. identifying vehicles in controlled areas such as parking garages). LPR technology has also been successfully applied in revenue collection applications (e.g. automatic billing of motorists using toll highways).

LPR is a complex process that is well documented in the literature and prior art. Various aspects of LPR methodology and terminology are relevant to the present invention and therefore merit summary description.

Essentially, LPR is comprised of three operations that are sequentially applied to the vehicle's raster image. These processes attempt to progressively refine the complex, unique identification of the vehicle captured in the raster image into an alphanumeric string of text identical to the text inscribed on the vehicle's license plate. Since this alphanumeric string of text is compact, easily comprehended and legally linked to the vehicle's owner, its correct extraction from the raster image is the ultimate goal of LPR. The interim digital encapsulations of the raster image that are part of the LPR process are less desirable however they also uniquely identify the vehicle in a way that has been exploited in certain LPR applications. The interim encapsulations of LPR are analogous to a person's fingerprint while the end product of LPR (the license plate number) is analogous to the same person's name.

The three conceptual steps that comprise LPR are:

Vectorizing the raster image (hereafter referred to as creating the "vector-model")

Step 1)Isolating only those vectors that describe the license plate within the vector-model (hereafter referred to as creating the "plate-model")

Step 2)Recognizing the alphanumeric characters in the plate-model (hereafter referred to as creating the "plate-string")

The three steps that comprise LPR can be summarized as follows:

Step 1) Vectorizing The Raster Image:

Discrete physical objects depicted in a raster image will generate zones within which all the pixels share similar color or gray-scale values. Vectors are mathematically defined lines that trace the perimeter of these zones. Some LPR algorithms make use of the aggregation of pixels inside these zones rather than their perimeter however for the purpose of this summary, they can be considered the same geometric entities. Before tracing the outline of these zones, spatial filtering algorithms are applied to the raster image to compensate for the effects of extraneous pixel noise (such as varying color caused by precipitation, dirt on the vehicle, slight variations in paint color, etc). The objective of vectorization is to identify and group only those pixels that correspond to real physical objects portrayed as discrete visual features in the raster image. In the case of a parked car's raster image, the desired vectors follow the silhouettes of the various mechanical parts and visual features that comprise the car (windows, fenders, bumpers, license plate, license plate text, dirt on license plate, etc). The vectorization algorithm may also outline discrete elements in the visible background scenery (sidewalk, trees, pedestrians etc.).

Spurious shadows in the vehicle's raster image will degrade the spat ial fidelity of vectors extracted from it. Therefore, many LPR systems improve their performance by illuminating the scene with supplementary lights, to minimize shadow effects in the image presented to the vectorization algorithm.

The set of all vectors extracted from a raster image using a particular algorithm constitutes a unique "digital fingerprint" for the scene in the ima ge. This unique identifier is hereafter referred to as the image's "vector-model". A vector-model generally occupies less storage space than the raster image from which it is derived. In addition, since the points and lines in the vector-model are mathematically defined entities, they lend themselves to the rapid computations required in steps 2 and 3 described below.

Step 2) Recognizing the License Plate Within the Vector-Model:

Algorithms are then applied to the image's vector-model to isolate only those vectors or zones of similar pixels that describe the license plate's physical structure. This unique "digital fingerprint" of the license plate is hereafter referred to as the "plate-model". Different algorithms could be applied to the vector-model to try to isolate other physical structures (the "bumper-model" the "window-model" etc). However, for typical applications, the license plate is the physical object of greatest interest, therefore the plate-model is the subset searched for within the image.

The rectangular shape of a license plate provides one criterion for testing if a candidate subset set of vectors is indeed the plate-model. However, there will typically be many vectorized rectangles in the vector-model that complicate isolating the plate-model (dealer logos, bumper stickers, parking permits, decorative trim etc.). Therefore, multiple geometric and stochastic tests are typically made on all candidate plate-models in order to rank their probability of being the correct one. When one of the candidate plate-models achieves a sufficiently high probability of modeling the real license plate, it is passed on to step 3 (described below).

Some LPR implementations only vectorize a subset of the total raster image and create the plate-model directly. Various methods have been used to directly localize the plate. One approach is to exploit the reflective paint used on many license plates. The plate's reflective surface can be used to localize it within the image without the need to vectorize other physical elements in the scene. Different LPR manufacturers use different terminology for the image's interim states as it is prepared for recognition of the license plate's alphanumeric characters. For the purposes of the present invention, the end product of LPR (the license plate number) as well as its precursor stages (referred to here as the raster image, the vector-model and the plate-model) are all encompassed within the term "unique vehicle identifier".

Step 3) Recognizing the Alphanumeric Characters in the Plate-Model:

The plate-model is then analyzed to transform the vectorized zones within its perimeter into an alphanumeric string of characters that spell out the vehicle's license plate number. The recognized string of text that estimates the vehicle's license plate number is hereafter referred to as the "plate-string".

Typically, before attempting to recognize the plate-string's characters, the distortion caused by an oblique camera angle is geometrically rectified. This geometric rectification procedure is generally referred to as "de-skewing". Since character recognition is based on analysis of the plate-model's geometry, de-skewing the perspective distortion of the vectorized zones will improve the accuracy of the character recognition algorithm.

Typically, one of three OCR methodologies is used to recognize each character of the plate-string from within the plate-model. "Structural analysis", "pattern matching", and "neural networks" are the terms commonly used for these algorithms. Each of these complex algorithms is well documented in the literature and has its unique advantages and disadvantages. Some LPR systems use combinations thereof to improve the reliability of the characters recognized from the plate-model.

To improve the reliability of character recognition, the LPR algorithm must also be customized to accommodate the different fonts, color schemes and character syntax's appearing on the plates issued in different transportation jurisdictions.

Full Recognition Mode LPR

The sequential 3-step algorithm described above is commonly known as "Full Recognition Mode LPR". Full Recognition Mode LPR algorithms cannot recognize the plate-strings of all observed vehicles with 100 percent accuracy. However, for some applications a certain number of plate-string errors is acceptable. For example, it is acceptable that a certain percentage of vehicles passing through a toll plaza not be correctly recognized (and thereby escape being billed the toll charge). Unrecognizable plates can be tolerated if the algorithm is at least able to compute that its best estimate of the plate-string is not sufficiently reliable, thereby permitting the enforcement system to simply ignore those "difficult" plate readings.

Pattern-Matching LPR

Some other LPR applications demand a very high degree of certainty that certain vehicles will be recognized. For example, a security camera might be setup to control access to a parking garage. In this scenario, it may be imperative that only authorized vehicles are permitted to enter and furthermore, that those vehicles are always allowed to pass. To deal with this requirement an algorithmic subset of Full Recognition Mode LPR known as "Pattern-matching LPR" is commonly employed.

"Pattern-matching LPR" doesn't rely on complete recognition of the alphanumeric plate-string to identify a vehicle. Instead, Pattern-matching LPR stops short of estimating the plate-model and simply compares (matches) the two vector-models (patterns) that are derived from two captured raster images. If the mathematical correlation between the two vector-models is sufficiently high then the algorithm concludes that the two images depict the same vehicle.

In the access control example given above, the vector model's of all authorized vehicles would be captured a priori and stored in the system's database, thereby permitting the Pattern-Matching algorithm to refer to the known vector-model of all authorized vehicles that request entry to the garage. The vector-models of all unauthorized vehicles will not correlate to any of the authorized vector-models and can therefore be denied access to the garage.

Conceptually, Pattern-matching LPR is the same as performing Full Recognition Mode LPR on the two raster images and then correlating the two computed plate-strings to see if they contain the same text (pattern). However, Pattern-Matching LPR has one important advantage over Full Recognition Mode LPR; since a plate-model contains more mathematically defined spatial information about the vehicle than a fully recognized plate-string, the correlation computed between two vector-models is less vulnerable to vectorization errors than the correlation of two fully recognized plate-strings. Pattern-matching LPR is therefore more reliable at determining if two raster images portray the same vehicle. However, Pattern-matching LPR cannot extract useful information from a single image and cannot make the legal link to the vehicle's owner (only Full Recognition Mode LPR can provide that information).

SUMMARY OF THE INVENTION

The present invention overcomes the problems associated with enforcing parking regulations by automating the manual processes performed by a Parking Enforcement Officer using the "tire-chalking" enforcement methodology described above.

Instead of manually applying chalk-marks to each vehicle, a digital camera captures a raster image of each vehicle along the patrol route thereby identifying it as being present in its observed location. A License Plate Recognition algorithm immediately extracts a unique digital identifier for the vehicle depicted in each raster image and stores it in a computerized database. Typically, the unique vehicle identifier is the alphanumeric text appearing on the vehicle's license plate (the "plate-string"). Each of the observed unique vehicle identifiers is stored in a database record that also contains the time it was observed and its geographic location. The time-stamp of each vehicle ID is typically read from the computer's internal clock while its geographic location is typically read from an external positioning system such as the "Global Positioning System" (GPS).

The driver of the patrol vehicle traces and re-traces the patrol route in a manner similar to an officer first applying chalk-marks to all parked cars along the route and then later searching along the route for marked cars that are over-parked. Each time a new image of a parked car is captured and its unique identifier has been determined, the computer searches its database to see if that vehicle identifier has already been observed by the system. If a matching vehicle identifier is found in the database, the computer compares the time and location of vehicle's first observation to the time and location of its second observation. If this comparison reveals that the vehicle has been parked at the same location for longer than the local parking time limit, then the computer sounds a "parking violation alarm" that commands the driver to stop the patrol vehicle. The system then prints out a legal parking citation describing the evidence of the infraction. The officer then visually verifies the evidence, signs the citation, affixes the citation to the offending vehicle and continues along the patrol route.

In an alternate embodiment, the same measurement technique is employed to determine the period of time each vehicle has been parked. However, instead of simply testing to see if that period is longer than the local parking regulation permits, the system uses the time parked to determine a parking fee and charge that fee to the vehicle's owner.

DETAILED DESCRIPTION

Reference will now be made in detail to preferred embodiments of the invention, examples of which are illustrated in the accompanying drawings. Wherever possible, the same reference numbers will be used throughout the drawings to refer to the same or like parts.

Figure 1:
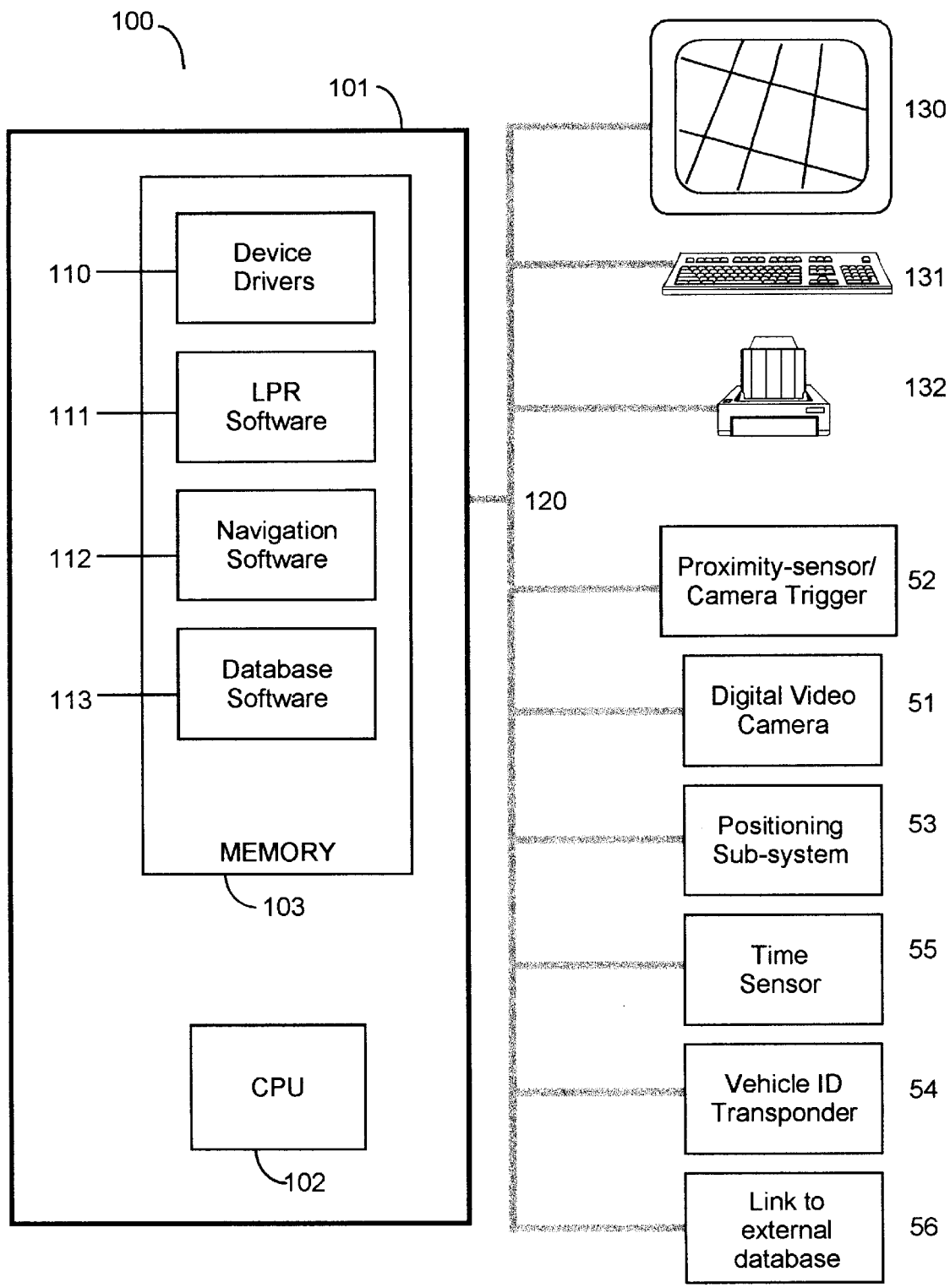
FIG. 1 is a block diagram of a computer system and sensors, according to a preferred embodiment of the present invention.

FIG. 1 is a block diagram of a computer system 100 in accordance with a preferred embodiment of the present invention. Computer system 100 includes a host computer 101. Host computer 101 includes a CPU 102, a memory 103, a communication bus 120, a display device 130 (e.g., a computer monitor), and input/output devices such as a keyboard 131 and printer 132. Memory 103 may include device drivers 110 and operational software modules. License Plate Recognition software 111, vehicle navigation software 112 and database software 113 are described in detail below. It will be understood by persons of ordinary skill in the art that computer system 100 may also include numerous elements not shown in the figure for the sake of clarity, such as disk drives, additional display devices, network connections, additional memory, additional I/O elements, additional CPUs, etc.

Computer system 101 also includes an operating system (not shown), such as the Windows 95 operating system. "Windows 95" is a registered trademark of Microsoft Corp. It will be understood that the present invention is not limited to any particular hardware, operating system, or type of computer system.

The computer system 101 is mounted within a parking regulation enforcement patrol vehicle 50 and communicates with external sensors and sub-systems over the communication bus 120. Various external sensors and sub-systems are connected to the communication bus 120 to observed data used by the present invention to enforce parking regulations. The principal peripherals connected to the computer 101 are:

A digital video camera 51 mounted on the moving patrol vehicle 50 such that it can capture a raster image of each parked car's license plate 61 as it transits the camera's field of view. The image data is communicated to the host computer 101 for processing by the License Plate Recognition software module 111.

A proximity sensor 52 affixed to the patrol vehicle 50 such that it senses the presence of passing vehicles and triggers the capture of images by the digital camera 51.

A positioning sub-system 53 that continually determines the position of the measurement point 53 on the moving patrol vehicle 50. The measurement point 53 is typically coincident with the antenna of the positioning sub-system 53. The observed positions are communicated to the host computer for processing by the database software module 113 and the navigation software module 112. The positioning sub-system 53 selected for use in the present invention can be LORAN, GLONASS, GPS, differential GPS, GPS/inertial, GPS/differential-odometer, GPS/differential-odometer/fluxgate-compass, GPS/map-matching etc.

A clock 55 that observes the time and communicates it to the host computer 101 for processing by the database software module 113. Typically the clock will be located within the host computer 101.

A printer 132 capable of printing a parking citation is connected to the host computer 101 a nd used to print parking citations as required by the database software module 113.

In a preferred embodiment described below, a radio frequency vehicle identification transponder 54 observes the unique identity of each parked vehicle and communicates each unique identifier to the host computer 101 for use by the database software module 113

In preferred embodiments described below, a data link 56 enables the transfer of information to and from various external databases maintained by various judicial and/or financial institutions. The link to data may a real-time communications link to data stored at a remote site, a real-time link over the local communication bus 120 to data stored on-board the patrol vehicle 50 or a post-mission link to data stored at a remote site.

Data Collection

Figure 2:
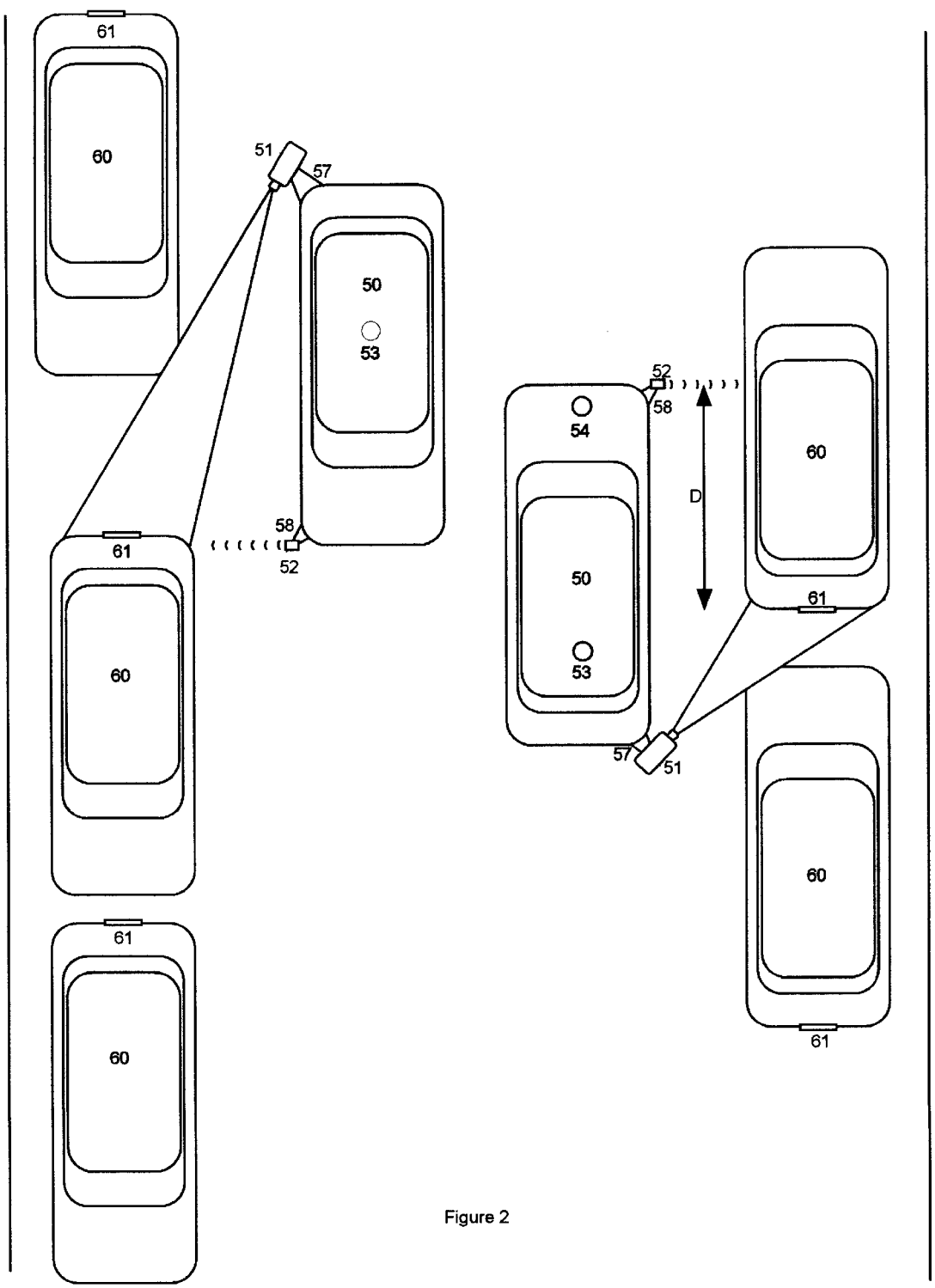
FIG. 2 is a top view of two patrol cars enforcing parking regulations along public a street, according to a preferred embodiment of the present invention.

FIG. 2, illustrates two instances of the parking patrol vehicle 50 being driven past a line of parked cars 60. A raster image showing each vehicle's license plate 61 is captured by the video camera 51 into the system's on-board computer 101. Each of these raster images shows a parked car 60 such that its license plate 61 is clearly visible.

In a preferred embodiment of the invention, the capture of each license plate image is initiated manually by an operator who aims and triggers the video camera when the license plate transits the center of the camera's viewfinder.

In another preferred embodiment, the capture of license plate imagery is triggered automatically without the need for manual aiming by an operator. To provide this function, an electronic "proximity sensor" 52 is mounted near the front end of the patrol vehicle 50 and aimed towards the parked vehicles 60.

In a preferred embodiment, the proximity sensor measures the changing distance between the patrol vehicle and the sides of parked cars 60. The range finder employed to sense the presence of each parked vehicle can be one of many "off the shelf" devices based on optical reflectance, ultrasonic ranging, laser ranging or other inexpensive distance measurement technology.

To optimize its view angle onto each license plate 61, the video camera 51 is typically mounted near the rear end of the patrol vehicle 50. The camera 51 is affixed to the patrol vehicle 50 by means of an adjustable mounting fixture 57 that permits the camera to be affixed at any location and orientation relative to the patrol vehicle 50. The camera is aimed obliquely towards the approaching parked cars 60, such that the camera's viewfinder frames the rear end of the parked car as it transits the proximity sensor's measurement beam 52.

While the proximity sensor 52 is aimed towards the unoccupied space between parked cars (i.e. while observing a "long" range), it asserts a "wait" command in the circuitry controlling the frame-grabber of the digital camera 51 ("frame-grabber" is the term commonly used for a video camera's "digital shutter"). As the patrol vehicle starts to transit the rear end of the next parked car along its route, the proximity sensor observes a rapid reduction in distance (assuming the proximity sensor being used is a distance-measuring device). The sudden reduction in distance output by the proximity sensor is detected by the device driver software 110 and transformed into a "shoot" command which fires the digital camera's frame grabber, thereby capturing a clear, oblique image of the rear end of the vehicle centered on the vehicle's license plate 61.

In another preferred embodiment, the proximity of each new vehicle 60 along the patrol is detected using an "off the shelf" metal detection means rather than the "off the shelf" distance measuring means described above. The camera's frame-grabber is triggered by the rapid rise in the signal from the metal detector that occurs as the metal detector comes abreast of the rear end of each parked car 60. To achieve adequate sensitivity, the metal detector's induction coil may be affixed to the patrol vehicle at the outboard end of a transversally mounted boom 58, thereby placing the vehicle sensor in closer proximity to each of the passing parked vehicles 60.

Once the camera 51 has captured an image, it reverts to the "wait" state, which continues until a sharp decrease in distance is observed by the range finder 52 (caused by refection form the rear end of the next parked vehicle). As the patrol vehicle's front end moves along the side of a parked car and starts to transit its front end, the proximity sensor 52 observes a rapid increase in distance that signals the start of the gap between parked vehicles. The proximity sensor 52 thereby enables the device driver software 110 to estimate the width of the gap in between each pair of parked cars. The time between the start and end of the gap is therefore observed and the multiplying it by the velocity of the patrol vehicle computes the distance across the gap. The distance across the gap between cars can also be observed the positions output from the positioning sub-system 53 when the proximity sensor 52 is triggered by rapid increases and decreases of signal strength.

Sometimes, the rear vehicle 60 is too close to the car in front of it to permit a clear view of the front vehicle's plate 61. Therefore, in a preferred embodiment, the device driver 110 prolongs the "wait" state until the camera's line of sight has transited the front end of the rear vehicle. The required delay period is computed using the speed of the patrol vehicle, the observed gap between parked cars and the baseline distance between the range finder and camera. In FIG. 2, the distance D illustrates the distance the patrol vehicle should travel before finally triggering the camera 51. The time delay required to achieve this optimal geometry is computed by dividing the patrol vehicle's current velocity by the distance required to achieve a clear line of sight onto the target license plate 61. The velocity is a parameter that is typically available from the positioning sub-system 53.

In another preferred embodiment (not illustrated), a plurality of distance sensors 52 are mounted along the side of the patrol vehicle 50, thereby measuring the distance between the side of the patrol vehicle and the sides of parked cars at multiple locations. As the patrol vehicle advances along the side of the parked vehicle 60, its front distance sensor eventually starts to measure a long distance (into the gap between parked cars). The remaining sensors will still be measuring short distances to the side of the parked vehicle. As the patrol vehicle advances, the remaining sensors each start to measure long distances as each comes abreast of the front of the parked car. Eventually, the front sensor encounters the rear end of the parked car and is hence directly abreast of the license plate 61 that must be captured by the camera 51. The device driver software 110 keeps track of the changing distances arriving from each of the distance sensors 51, thereby modeling the gap between the parked vehicles 60. Knowing the fixed geometry of all the sensor components affixed to the patrol vehicle as well as the relative position of the gap between the two parked cars, the device driver 110 waits until the camera's line of sight has reached the first location at which the front parked car's license plate is unobstructed by the rear parked car before triggering the capture of the front car's digital image. This embodiment effectively models the distance D shown in FIG. 2.

In a preferred embodiment, the baseline distance between the proximity sensor 52 mounted near the front of the patrol vehicle 50 and the video camera 51 mounted near the rear of patrol vehicle is maximized thereby insuring that the camera's line of sight is not aimed onto the target license plate 61 at too oblique an angle. To provide an adequately long baseline, the range finder sensor and/or the video camera may be affixed to the patrol vehicle 50 by means of a mounting fixture 57 and 58 that may extend somewhat in front of or behind the patrol vehicle.

Figure 3:
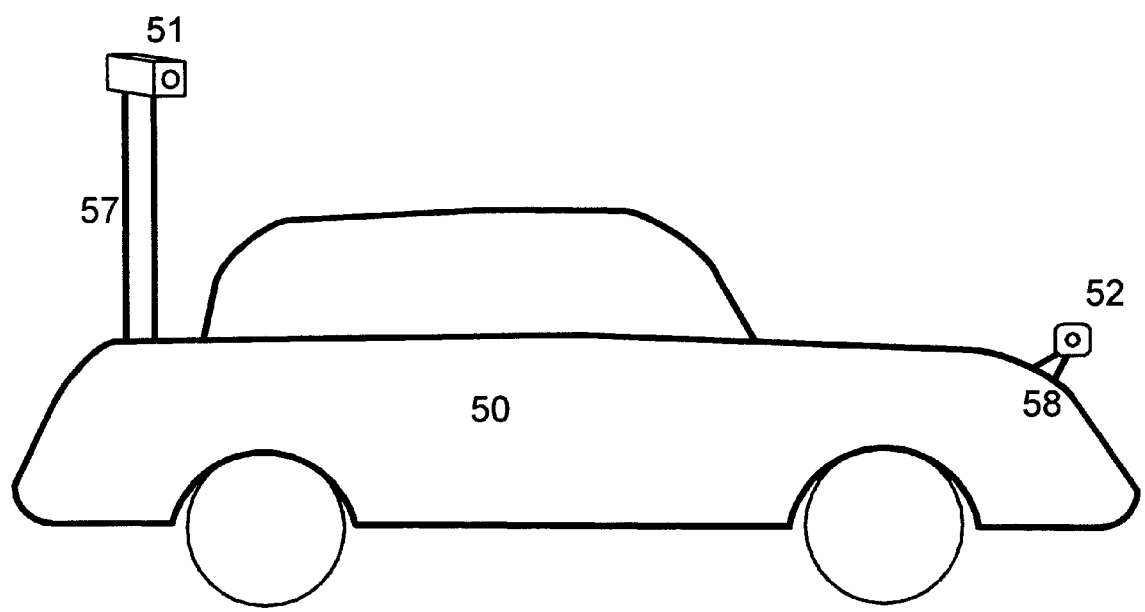
FIG. 3 is a side view of a patrol car enforcing parking regulations on public streets, according to a preferred embodiment of the present invention.

The higher the video camera 51 is mounted on the patrol vehicle 50, the easier it is to see over the hood of the vehicle 60 parked behind the target license plate 61. Therefore, in a preferred embodiment, the video camera mount 57 permits the camera 51 to be affixed high enough above the patrol vehicle 50 to see the target license plate 61 over the hood of parked cars 60. FIG. 3 is a side view that illustrates how the camera mount 57 might be deployed in an operational scenario.

In another preferred embodiment, when the camera's frame grabber is triggered, it fires rapidly in succession, thereby capturing a series of images of the same license plate 61. The plurality of observed images of each license plate insures that the LPR algorithm used to recognize the vehicle's unique digital identifier can analyze at least one image that adequately depicts the license plate 61. While somewhat wasteful of computing resources, capturing continuous video imagery of the passing parked cars 60 therefore improves the reliability with which vehicles can be identified.

In another preferred embodiment, all of the video imagery observed by the camera 51 is geo-referenced, time-stamped and archived for possible use by law enforcement authorities. For example, if a bank robbery has occurred, police can then review the video imagery captured by parking patrol vehicles that happened to be working in the vicinity of the crime to search for visual evidence relevant to their investigation.

Figure 4:
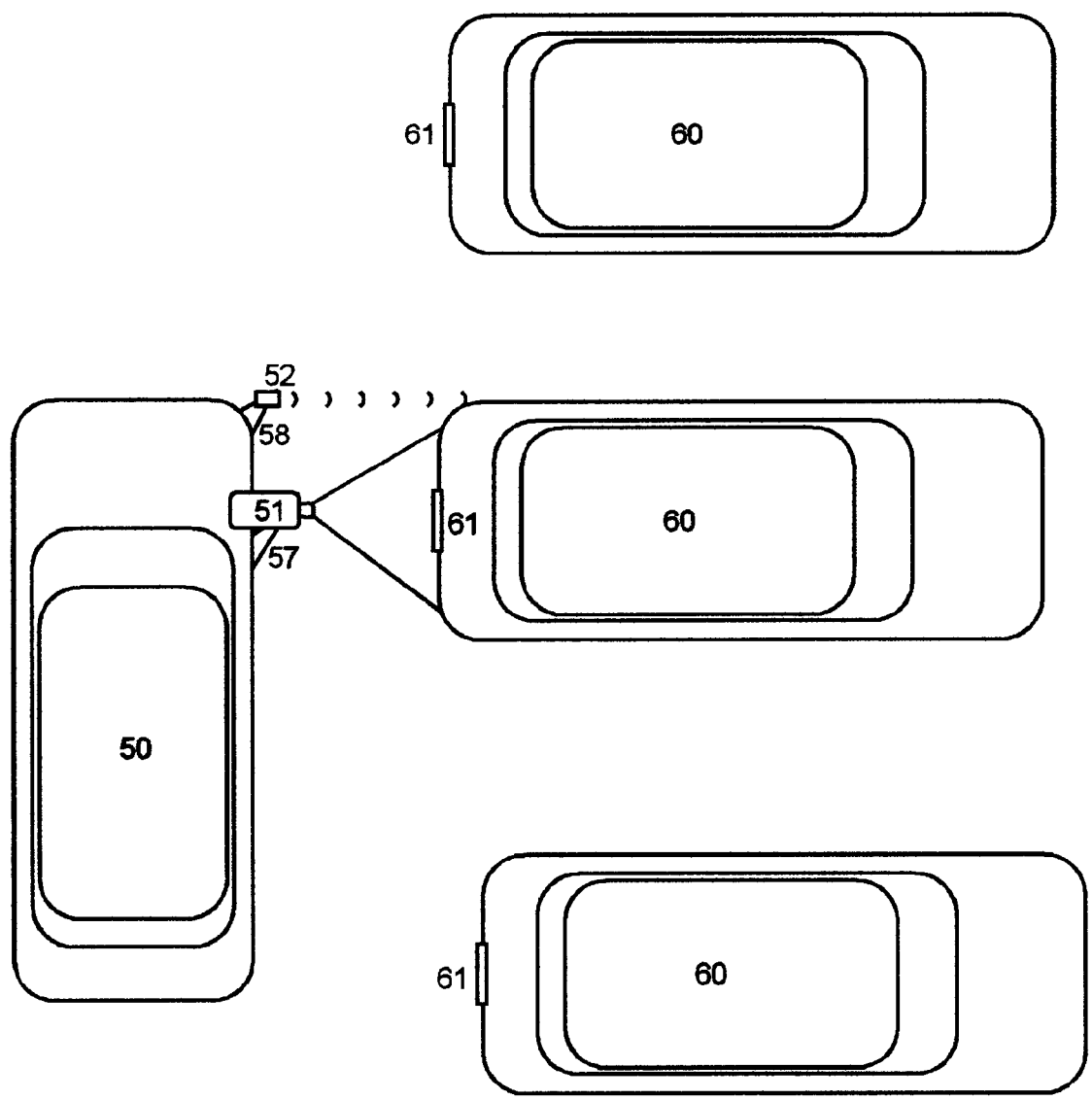
FIG. 4 is a top view of a patrol car enforcing parking regulations in a private parking facility, according to a preferred embodiment of the present invention.

FIG. 4 illustrates cars that are parked side by side rather than end to end. This parking configuration is typical of how cars are parked in off-street parking lots. Some municipalities have very wide road allowances that also permit side by side parking. When parked side by side, the cars present their license plates 61 in a more favorable orientation relative to the passing patrol vehicle (approximately at right angles). Side by side parking therefore dictates that the camera triggering mechanism on the patrol vehicle 50 must be altered to compensate for the different camera geometry. Therefore, in a preferred embodiment, the camera 51 can be rotated from its oblique orientation, (angled forward to capture the license plates of cars parked end to end) to the substantially orthogonal orientation depicted in FIG. 4 (angled straight out to capture the plates of cars parked side by side). Furthermore, the vehicle proximity sensor used to detect cars parked side by side is mounted closer to the camera's location (approximately half the width of a typical car), thereby permitting the proximity sensor to trigger each image capture when the camera is correctly centered on the license plate 61.

Another physical characteristic of cars parked in areas that permit side-by-side parking is exploited by the present invention, thereby improving the efficiency with which Epoch-IDs are observed. The roadway separating rows of cars parked side-by-side is often free of the on-coming traffic, which (on public streets) constrains the patrol vehicle to observe cars parked along only one side of the street. To observe all of the cars parked along both sides of the roadway therefore requires two circuits of the patrol route (one in each direction). If however the patrol vehicle has unobstructed use of the roadway (such as in private parking facilities or lightly traveled public streets) then greater efficiency is obtained by observing the parked cars along both sides of the roadway at once (effectively doubling the productivity of each patrol vehicle).

Therefore, in a preferred embodiment (not illustrated), the patrol vehicle 50 is equipped with two video cameras 51, each camera being oriented towards one of the two sides of the roadway. Additional proximity sensors 52 are also provided to trigger each of the two cameras as each new parked car transits their viewfinders. Since the proximity sensors will be operating at a greater distance from the parked cars, less precise triggering of each camera's frame-grabber will often result. Therefore, the LPR software 111 used to analyze imagery from both cameras may be modified to place greater reliance on the analysis of multiple images depicting each parked vehicle 60.

At the same instant that each vehicle's raster image is captured by the video camera 51, the computer also captures the current time (from the time sensor 55) and the vehicle's current geographical position (from the positioning sub-system 53). These three observed data (time, location and vehicle identifier) are concatenated and stored as a data record in the system's database 113. Each of these data records is hereafter referred to as the parked vehicle's "Epoch-ID".

The geographic coordinates observed by the positioning sub-system 53 define the position of the patrol vehicle 50 rather than that of the (nearby) parked cars under surveillance 60. The infraction detection algorithm described below assumes that the coordinates logged in the Epoch-ID describe the position of each parked car. Therefore, in a preferred embodiment, the distance observed from the patrol vehicle 50 to each parked vehicle 60 (measured by the range finder) is used to estimate the desired geographic coordinates of each parked car's license plate. The known geometry between the location of the camera 51, the range finder 52 and the positioning system's antenna 53 are also used to project a position estimate for each parked car's license plate 61. The estimated position of the license plate is then stored in each parked vehicle's Epoch-ID.

Data Processing

Recognition of Each Vehicle's Unique Identity

As soon as a parked car's geo-referenced and time-stamped raster image of has been captured into the host computer 101, the computer applies an "License Plate Recognition" algorithm 111 to the image.

In preferred embodiments of the present invention, Pattern-matching LPR and Full Recognition Mode LPR are applied to the captured imagery (both methodologies are summarized above in the "technical background"). In preferred embodiments (described below), the two LPR methodologies are applied both separately and in concert, thereby optimizing t he system's flexibility and reliability.

The LPR sub-system 111 selected as a component in the present invention must be fast enough that the time required to uniquely identify the vehicle in each raster image is somewhat less than the time it takes for the patrol vehicle 50 to travel the distance between parked cars 60. Ideally, this processing takes place quickly enough that the patrol vehicle 50 can be driven at the normal speed of traffic.

At the same instant that each vehicle's raster image is captured and a unique vehicle identifier is extracted from it.

The system's computer also captures the current time and the current geographical coordinates observed by the positioning sub-system. These three observed data (time, location and unique vehicle identifier) are concatenated and stored as a data record in the system's database. Each of these data records is hereafter referred to as the parked vehicle's "Epoch-ID".

Storage and Use of Data Reliability Indicators in a preferred embodiment, statistical reliability indicators for each of the three observed data in the Epoch-ID are computed and stored along with their respective data element (i.e. the reliability of each time observation, position observation and vehicle identity estimate are recorded). These reliability indicators are subsequently used to enhance the performance of the real-time violation detection algorithm 101. The reliability indicators also facilitate several control functions exercised by the system's operator. The reliability indicators may ultimately be used as evidence in court to defeat a legal challenge of the parking citation's validity. The Epoch-ID's three reliability indicators are described as follows:

1) The Epoch-ID's Temporal Reliability Indicator:

Since infractions are detected by subtracting two time-stamp observations, the absolute accuracy of each Epoch-ID's time-stamp is not critical (gross clock errors will be subtracted out by the detection algorithm). Therefore, as long as the difference between the two Epoch-ID's time-stamps can be shown to be accurate to within a few seconds, the temporal component of the parking infraction detection algorithm will remain sufficiently accurate. The time sensor 55 used to time-stamp each Epoch-ID will typically be provided by the standard clock integral to a computer 101. Provided that the Enforcement Officer periodically verifies that the computer's clock is not drifting wildly from an independent time source (such as the time announced on a car-radio), the temporal accuracy of the system can be logged as being better than a few seconds.

In a preferred embodiment, the system's position sensor 53 is a GPS receiver that can provide a very accurate time synch output. The system's local clock uses the time signal to automatically synchronized to within a few milliseconds of GPS time, thereby far exceeding the minimum requirement for temporal accuracy.

2) The Epoch-ID's LPR Reliability Indicator:

Many aspects of LPR are stochastic processes. An estimate of the statistical reliability of each recognized plate-string is therefore a by-product of most Full Recognition Mode LPR algorithms. If a Pattern-matching LPR algorithm is applied to the imagery, the computed correlation factor between the two matched vector-models is also a good statistical reliability indicator. Therefore, in a preferred embodiment, a statistical reliability estimated for the plate-string and/or the pattern-match is included in each stored Epoch-ID.

To reduce the chance of false alarms from the parking violation alarm, the Officer can link its sensitivity of the to the computed reliability of the LPR process. In a preferred embodiment, the violation alarm's sensitivity is adjusted by varying a threshold value used to reject LPR data that is not considered sufficiently reliable. For example, the database software 113 could ignore all plate-strings whose probability of being true is less than 90 percent. Similarly, if the correlation factor between two vector-models were less than 0.90, then a match between Epoch-IDs would not be declared. Raising the value to 95 might reduce the number of false alarms at the expense of missing some real opportunities to issue citations. Lowering it to 85 might trigger the alarm more often however the Officer might also waste more time visually verifying license plate numbers that turn out to be incorrectly recognized or matched.

The plate-string recognized in each captured image is the most succinct digital encapsulation of the vehicle's unique identity that can be derived from the LPR process. The plate-string is therefore the best search criteria for quickly searching the database to detect parking violations. Furthermore, the plate-string (the license plate number) can also be used to link into useful external databases 56.

While the plate-string has the advantage of being concise, it's the entire raster image from which the plate-string is derived that is each vehicle's most complete and unique identifier. Therefore, in a preferred embodiment, the vehicle's raster image is also stored as part of the Epoch-ID and archived to enhance the system's reliability. These images may eventually serve as evidence in court.

The stored raster imagery also serves as a means for independently verifying the validity of the LPR process. In a preferred embodiment, whenever the violation alarm is triggered, the system immediately displays the two raster images contained in the Epoch-IDs found to match by the database software 113. Displaying the images on the system's display device 130 provides an independent and reliable means of verifying the accuracy of both of the plate-strings that were estimated by the LPR algorithm. To verify that each plate-string is correct, the Officer inspects the displayed images and reads both of their visible license plate numbers. The Officer then compares the visually read plate-strings to the matched plate-string that triggered the infraction alarm (also displayed on the monitor 130). This visual verification step is carried out by the Officer prior to signing the parking citation and affixing it to the offending vehicle.

Both the vector-model and the plate-model computed by the LPR algorithm are essentially less verbose, encapsulations of the same unique vehicle identifier captured in the raster image. Therefore, in a preferred embodiment, each raster image's vector-model and/or plate-model is also stored in the Epoch-ID. By retaining the vector-model and/or plate-model, they become available for re-analysis to either: confirm the plate-string, correct the plate-string or provide an alternate method of matching Epoch-IDs. The analytical exploitation of interim LPR data is performed by one of three possible embodiments:

1) In a preferred embodiment, the Enforcement Officer exploits the vector and/or plate models by plotting them onto the system's computer display screen. The Officer inspects the image of the license plate to confirm the violation prior to signing the parking citation and serving it on the offending vehicle, (similar to the procedure described above for verifying the plate-string by inspection of the raster images). Since vector-models occupy less storage space than raster images, this embodiment eases the load on the system's computing resources.

2) In a preferred embodiment, near real-time re-analysis of the captured vector models is carried out by a second LPR algorithm prior to issuing a violation alarm. This embodiment would also be used as a means to reduce the load on the system's computing resources. For example, a first Full Recognition Mode LPR algorithm that is very fast but somewhat less reliable would be used to initially detect suspected violations. Once a suspected violation is detected by the first LPR algorithm, a second, more reliable but slower executing Full Recognition Mode LPR algorithm, would be applied to the same data, thereby improving the reliability of the citation. Only after the two Epoch-IDs have passed the second, more rigorous, extraction of matching plate-strings would the violation alarm be triggered to alert the system's operator to stop the patrol vehicle and issue a citation.

3) In a preferred embodiment, the two vector-models stored in suspected Epoch-IDs flagged by Full Recognition Mode LPR are then submitted to a Pattern-matching LPR algorithm. Since the results of a pattern-match are inherently more reliable than the results of a plate-string, confirmation by this re-analysis of the data adds to the reliability of citations issued by the system.

3) The Epoch-ID's Spatial Reliability Indicator:

The statistical reliability of the geographical positions used in the violation detection algorithm are also quality indicators that add weight to the body of evidence that may eventually be presented in court. Therefore, in a preferred embodiment, an estimate of each observed position's probable error is made and included in the Epoch-ID.

The present invention can use an "off the shelf" positioning system to provide geo-referencing information for each Epoch-ID. Satellite systems such as the Global Positioning System (GPS) are the preferred sub-system. Other sub-systems such as LORAN, GLONASS, differential GPS, GPS/inertial, GPS/differential-odometer, GPS/differential-odometer/fluxgate-compass and GPS/map-matching are also acceptable sub-systems. The integration of GPS with other sensors is a common practice that is useful in areas of poor satellite visibility (such as near high buildings). All of the above positioning system configurations are well-established technologies that, due to redundant range observations, lend themselves to real-time error estimation. In a preferred embodiment, the positional error estimate provided by the geo-referencing sub-system is stored in the Epoch-ID to provide Quality Control of the spatial parameter.

The geographic coordinates observed by the positioning sub-system define the position of the patrol vehicle rather than that of the (nearby) parked cars under surveillance. The parking violation detection algorithm described below assumes that the coordinates logged in the Epoch-ID describes the position of each parked car. Therefore, in a preferred embodiment, the distance observed from the patrol vehicle to each parked vehicle (measured by the range finder) and the known geometry between the location of the camera, the range finder and the positioning system's antenna, is used to compute the geographic coordinates of each parked car's license plate. The estimated position of each license plate (and its estimated uncertainty) is then stored in the parked vehicle's Epoch-ID.

Embodiments That Use Full Recognition Mode LPR

Figure 5:
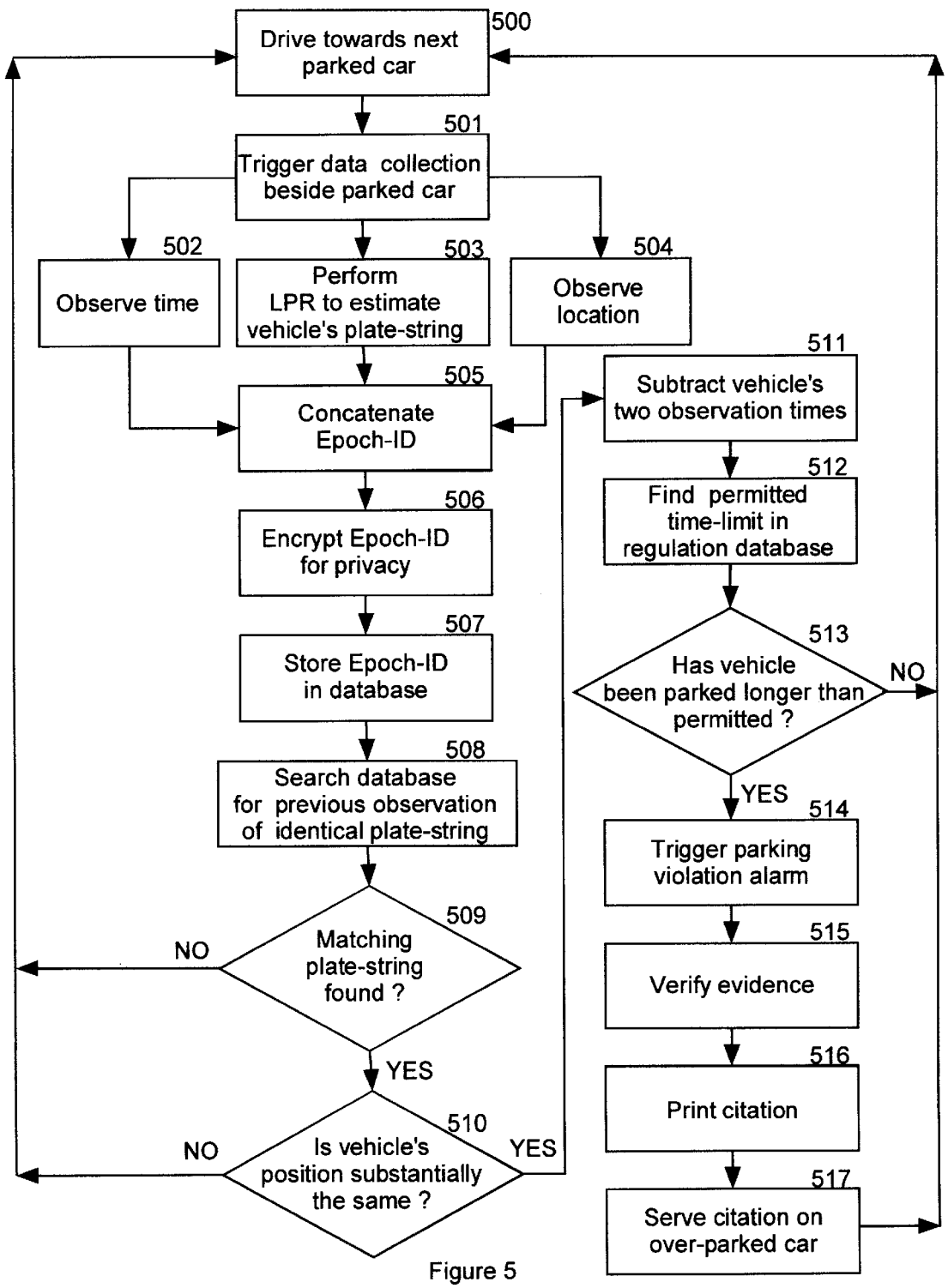
FIG. 5 is a flow chart of the data processing algorithm used by the present invention to detect over-parking infractions on public streets and issue parking citations by means of Full Recognition Mode LPR.

FIG. 5 is a flow chart illustrating the procedures implemented by the present invention to enforce parking regulations by means of applying Full Recognition Mode LPR. In a preferred embodiment, the patrol vehicle is driven past a row of parked cars 500 and the plate-string visible in each successively captured raster image 501 is extracted using Full Recognition Mode LPR 503. Each plate-string 503 is geo-referenced 504 and time-stamped 502. The observed plate-string, its time of observation and its location of observation are concatenated into an Epoch-ID record 505 that is suitably formatted for storage in the system's database 113. The reliability indicators described above are also concatenated into the Epoch-ID (not illustrated). To assure the privacy of citizens (described below) the data is typically encrypted 506 before being stored in the database 507.

As soon as each Epoch-ID has been entered into the database, the computer searches to see if the same plate-string has been observed previously by the system 508. If no matching vehicle identifier is found 509, then the algorithm reverts to waiting for the next parked car to be encountered 500.

If a previous instance of the plate-string is found in the database of Epoch-IDs 509, then the vehicle's previous position coordinates are compared to its current position coordinates 510.

If the difference between the two observed positions reveals that the vehicle has not moved an appreciable distance since its previous observation, then the system flags the vehicle as being under suspicion of violating the parking regulations 510. If the distance between the two observations is substantially different, then the algorithm goes back to waiting for the next parked car to be observed.

In a preferred embodiment, the positional test for whether or not the observed vehicle has moved "substantially" includes a distance tolerance to compensate for the instrumental error inherent to the positioning sub-system 53 (QC information already recorded during step 505). For example, if the positions submitted to the immobility test 510 have an estimated accuracy of +/-3 metres, and the distance between the coordinates is 2 meters, then a tolerance of 3 meters will insure that the vehicle is flagged as having been immobile (even though the two positions are not numerically identical).

The test criteria for determining if the vehicle has moved an "appreciable" distance may also include a required radius of movement stipulated in municipal parking regulations. For example: a municipality's parking regulations might stipulate that a car must be moved at least 200 m in order to "restart" its legal parking status. Including this 200-meter radius in the positional tolerance insures that motorists who have not moved their vehicle the required distance will be flagged for a parking citation.

When a suspect vehicle has been flagged 510, the system then subtracts the time stamps of the two Epoch-IDs under suspicion 511, thereby determining the period of time that the car has been parked at that location.

The system then searches a database of geo-referenced parking regulations (described below) to determine the legal time limit that's applicable to the parked vehicle's present location 512.

If the elapsed time is greater than the time period legally permitted for that location, then the system declares a parking violation 513. If the time the vehicle has been parked does not exceed the time permitted then the algorithm goes back to waiting for the next parked car to be observed 500.

When the system declares a parking violation, a "parking violation alarm" is triggered 514, thereby alerting the Officer to stop the patrol vehicle. The "parking violation alarm" used to alert the Officer may be a visible message displayed on the CRT 130. Alternatively, the parking violation alarms can be an audible sound from the speaker normally integral to the computer 101.

In a preferred embodiment, when the parking violation alarm is triggered, the computer 101 displays the two stored images of the parked vehicle on the display monitor 130. The Officer then verifies that the two images appear to portray the same vehicle. The Officer also visually verifies that the two plate-strings are identical to the plate-string recognized by LPR analysis 515.

After the LPR vehicle identification has been independently verified, the system uses the output device 131 to print an official parking citation that summarizes the evidence relevant to the parking infraction 516. The printed parking citation will typically display (at least) the following data elements:

1) The two matching plate-strings (license plate numbers) that were recognized from the two digital images of the (same) parked car 60. The original raster or vector imagery may optionally be printed on the citation.
2) The time that each of the two license plate numbers was observed. The elapsed time as well as the permitted parking period may optionally be printed onto the citation.
3) The geographical coordinates of the two independent sightings of the parked vehicle 60. The distance between the two observations may optionally be computed and shown on the citation.
4) The in formation needed to describe the local parking regulation that has been contravened (the parking time limit at the time of the infraction, the street name where the infraction occurred, etc.).

As soon as the parking citation has completed printing (typically the time it takes to stop the patrol car 50 and back up to the offending parked vehicle 60) the Enforcement Officer signs the citation, serves it on the vehicle's owner by attaching it to the windshield of the offending vehicle and then continues driving along the patrol route towards the next parked car 500.

Embodiments That Use Pattern-Matching LPR

Figure 6:
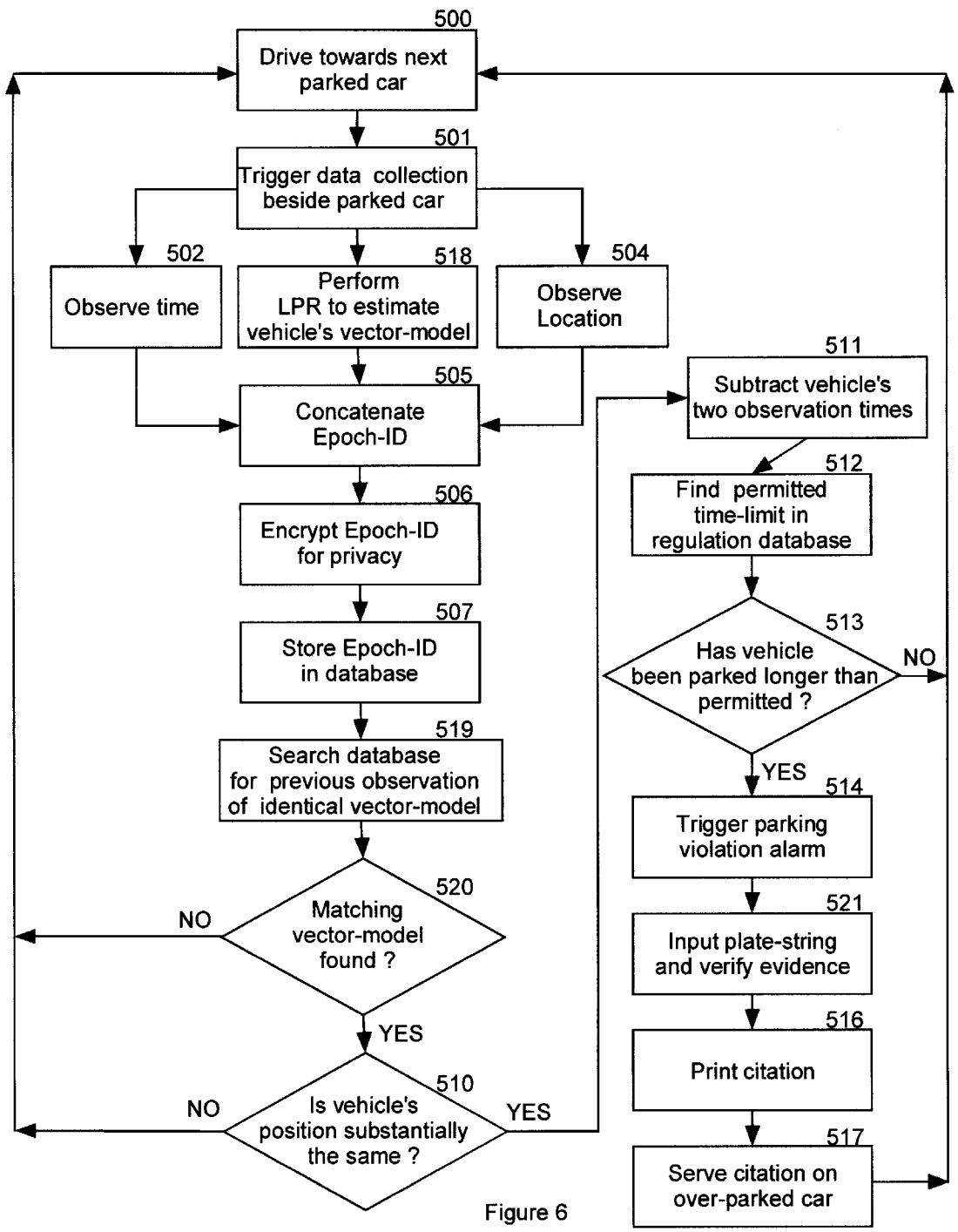
FIG. 6 is a flow chart of the data processing algorithm used by the present invention to detect over-parking infractions on public streets and issue parking citations by means of Pattern-Matching LPR.

FIG. 6 is a flow chart illustrating procedures implement ed by the present invention to enforce parking regulations by means of applying Pattern-Matching LPR to the captured images. This algorithm is very similar to that illustrated in FIG. 5 however Full Recognition Mode LPR image analysis 503 is replaced with Pattern-Matching image analysis that simply derives a vector-model from the license plate image 518. The patrol vehicle traces and re-traces the patrol route in the manner described above. However, instead of searching the database for a matching plate-string, the algorithm searches the database for a matching plate-model 519. The added certainty with which the algorithm can match the more detailed vector-models improves the certainty with which the system can declare a vehicle to have been re-observed 520. Using pattern-matching LPR therefore improve s the accuracy and reliability of the parking violation alarm 514.

When a pattern match is found, the system tests to see if the two matching Epoch-IDs were observed at substantially the same location 510 and if the time between the two observations exceeds the permitted parking limit 513. If the position and time tests reveal that a parking infraction has occurred, then the violation alarm is triggered 514.

The Officer then stops the patrol vehicle however the offending parked vehicle's license plate number is still unknown and must therefore be identified manually. To facilitate identifying the vehicle, the system displays the two raster images and/or vector-models that triggered the alarm. The Officer then visually inspects the images to verify that the vehicle captured at the first and second observation epochs appears to be the same make and model of car. If the violation alarm passes this visual inspection, the Officer then reads and enters the alphanumeric characters on the vehicle's license plate into the system where it becomes the plate-string inserted into each of the Epoch-Ids 521. Data entry is typically effected using the keyboard 131. The human-read plate-string is flagged as such in the Epoch-ID, thereby certifying its high level of certainty in the event that the parking citation is contested in court. Once the plate-string has been entered, the system proceeds to print out the parking citation 516, the Officer serves it 517 and proceeds along the patrol route 500.

In another preferred embodiment (not flow-charted), the Pattern Matching LPR method is first used to detect a suspected parking infraction. Once the violation alarm has been sounded, the system applies then the less reliable (but more useful) Full Recognition Mode LPR algorithm is applied to the two images of the vehicle's license plate. If the plate-strings extracted from the images are identical then the imagery and alphanumeric data are displayed to the Officer for visual inspection and certification. If the plate-string does not match the Officer's visual interpretation of the imagery (for example, the numeral "zero" may have been recognized as the letter "O" by the LPR algorithm) then the Officer edits the plate-string. Since the plate-string will, in most cases, be correct the Officer's data input workload is thereby reduced.

The database search to Pattern-Match plate-models 519 is more time consuming than when Full Recognition Mode LPR is used to find matching plate-strings 509. This is because searching for a specific alphanumeric plate-string is faster than searching for a relatively complex vector-model, particularly as the number of Epoch-IDs in the database grows large. To address this speed limitation, a preferred embodiment of the present invention utilizes the information available from the positioning sub-system 53 to accelerate the search for matching vehicle identifiers. As each new Epoch-ID is observed 505, instead of searching through thousands of records in the database for a matching vehicle identifier, the database first searches to find those few Epoch-IDs that are positioned a short distance from the current Epoch-ID. Conducting a preliminary "nearest neighbor" search of the database is much faster than trying to find a matching plate-model 520. By localizing the search to only those few vehicles that might conceivably be the same (over-parked) vehicle, extra processing time becomes available for carrying out more sophisticated LPR analysis.

The distance criterions used to search for "nearest neighbor" Epoch-IDs will typically be the same distance criterion used by the violation detection algorithm to test if a vehicle has moved "appreciably" between observations (described above). The nearest neighbor distance criterion may therefore be comprised of a distance to compensate for instrumental noise in the positioning system as well as a regulated distance imposed to force motorists to completely vacate the vicinity after legally occupying a parking spot.

Therefore, in a preferred embodiment, the database search 519 also comprises a preliminary nearest neighbor search to find Epoch-IDs located a short distance away from the patrol vehicle's current geographic location. The few Epoch-IDs found by this preliminary search are then searched to see if there are any matching plate-models. If a plate-match is found, then the rest of the data processing proceeds as illustrated in FIG. 6.

In another preferred embodiment (not illustrated), the Full Recognition Mode LPR methodology is first applied to all captured imagery. If however the estimated reliability of either of the plate-strings matched in step 509 does not meet a user defined confidence tolerance, then the algorithm will perform a second iteration of analysis on the two candidate images in an attempt to match their vector or plate-models. Since there is more information contained in two vector-models (fenders, windows, tires, visual artifacts on the license plate etc.), their mathematical correlation can be determined with greater confidence than when correlating two fully recognized plate-strings. Only after the two candidate images have passed this second iteration of LPR analysis does the algorithm proceed to test for a parking violation.

Embodiment That Uses Radio Frequency Transponders For Vehicle Identification

The embodiments described above rely on LPR technology to uniquely identify each of the parked cars along the patrol route. LPR has the significant advantage of being an entirely passive means of determining the unique identity of vehicles (i.e. all registered vehicles are already equipped to be identified). To facilitate new highway applications such as automated toll collection, there is a growing trend to provide an active means for identifying each vehicle (i.e. means that demand a component be affixed to each vehicle in order for it to be recognized). Various means have been developed for actively identifying vehicles. Bar codes imprinted onto each vehicle have been proposed. The bar codes are subsequently optically scanned to determine the vehicle's identity and are therefore functionally equivalent to LPR of the vehicle's alphanumeric license plate number. Magnetic encoding strips affixed to each registered vehicle has also been proposed as a means for actively identifying vehicles.

Another proposed means for actively identifying each vehicle is provided by a low-power radio-frequency transponder affixed to each vehicle monitored by the system. Each mobile transponder responds to a low-power interrogation signal broadcast from stationary highway infrastructure (such as an automated tollbooth). The low broadcast power of the mobile and stationary transponders limits their range such that each mobile transponder is triggered only when it is in close proximity to the stationary transponder. When interrogated, the vehicle's transponder responds by broadcasting a low-power radio-frequency data signal that contains the vehicle's unique identification code (e.g. its license plate number). In the future more and more vehicles will be equipped with active identification means such as transponders, therefore transponder technology provides a viable alternative to using LPR technology in the present invention.

Figure 7:
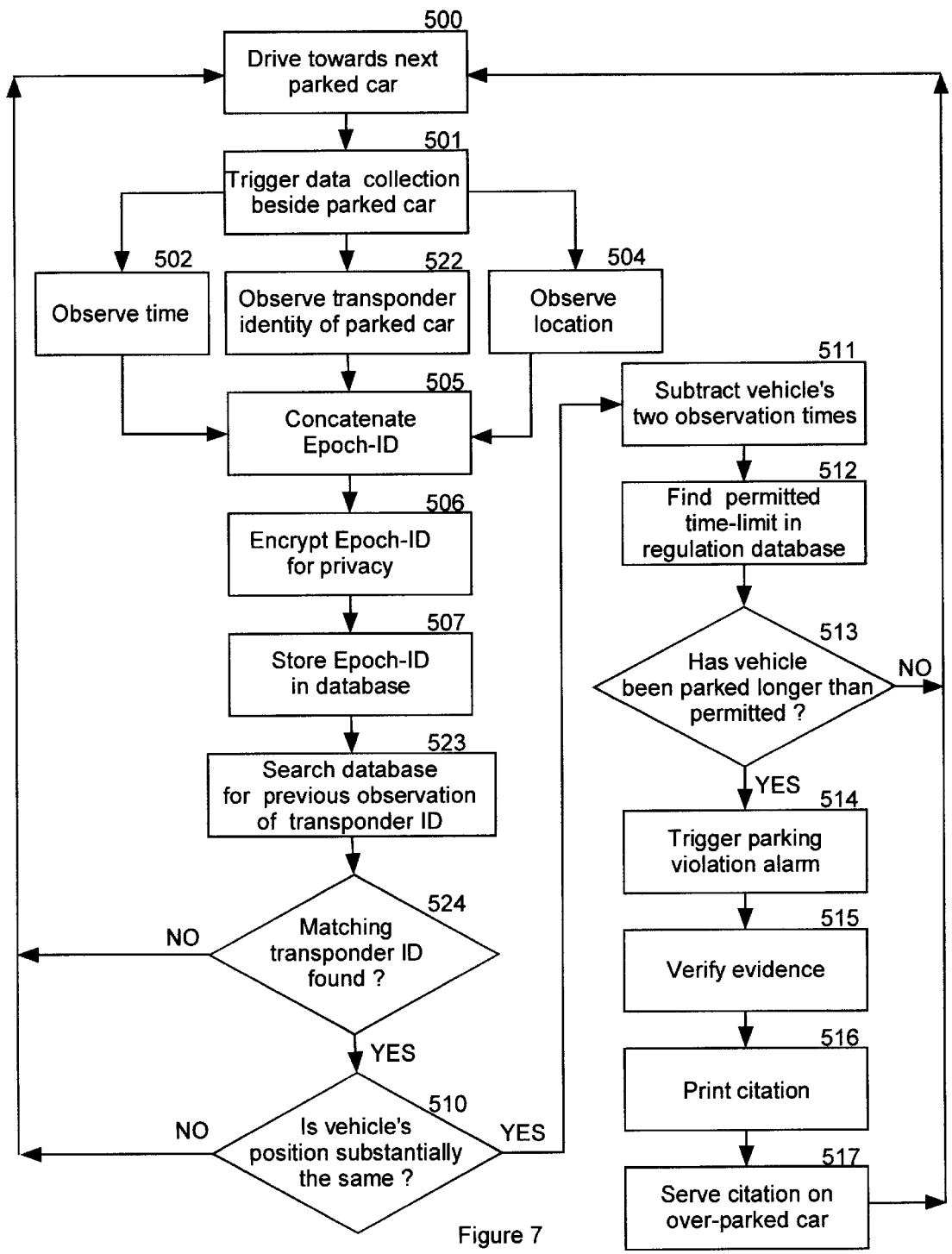
FIG. 7 is a flow chart of th e data processing algorithm used by the present invention to detect over-parking infractions on public streets and issue parking citations by means of radio frequency transponders.

FIG. 7 is a flow chart illustrating procedures implemented by the present invention to enforce parking regulations using a radio-frequency transponder 54 affixed to the patrol vehicle 50 as the means for observing the unique identity of each vehicle encountered along the patrol route. The unique digital identity broadcast from the parked car 60 in is received by the patrol vehicle's transponder 54 and inserted into the Epoch-ID 522 (in lieu of a unique vehicle identifier derived by LPR). Once the parked vehicle's transponder ID has been received, geo-referenced, time-stamped and inserted into the Epoch-ID, the database search is conducted to search for a matching vehicle ID 524. If a match is found, all aspects of processing proceed as described above for detecting parking violations using LPR technology.

In another preferred embodiment (not illustrated), the present invention employs both LPR and transponder technology to observe each parked car's unique vehicle identity along the patrol route. Vehicle's without transponders are identified using LPR as described above. However, those parked vehicles equipped with a transponder will respond to the patrol vehicle's interrogation, thereby providing a redundant vehicle identifier that the system adds to those vehicles' Epoch-IDs. This redundant vehicle identifier adds to the body of evidence used to support claims against the vehicle's owner.

Embodiment That Enables Charging a Pay Per Use Fee

The preceding embodiments emulate the tire-chalking methodology commonly used to detect illegally parked cars and levy a financial penalty on their owners. This "penalty mode" of parking enforcement cannot accommodate the collection of modest rental fees from vehicles that are legally parked for short periods. This shortcoming dictates that most motorists under surveillance by the system will in fact park for free (as long as they do not park longer than the arbitrary time limit). This is a serious financial drawback when compared to parking meters. Parking meters require motorists to insert coins, thereby providing a continuous revenue stream to the municipality, even if no cars are ever convicted of over-parking.

The tire-chalking methodology lays the entire financial burden of the system on tho se few motorists caught over-parking and this contributes to a public perception of unfairness. For example: two motorists park in the same two-hour zone at the same time. The first motorist returns one minute before the patrol vehicle makes its second round and thereby escapes without having paid any parking fee. The second motorist arrives only two minutes later to find a $25 parking citation. This perceived unfairness adds to the psychological stress endured by all motorists.

Therefore, in a preferred embodiment, the present invention provides means that enable the Parking Authority to collect modest rental fees from those vehicles that are legally parked for short periods along public streets (in a manner analogous to that used in the parking meter enforcement methodology). The net effect of using this embodiment is to transform all of the real estate along the municipality's streets into a "pay per use" parking lot without having to install and maintain physical parking meters.

To provide the necessary revenue collection means, the previously described embodiments that emulate tire-chalking enforcement are linked to a central, computerized billing system 56. When the data observed by the patrol vehicle is linked to an external database 56 at a financial institution, the present invention can emulate the "pay per use" financial structure inherent to parking meters.

Motorists (hereafter referred to as "clients") wishing to make use of the "pay per use" parking service must enter into an agreement giving permission to the Municipal Parking Authority to withdraw funds from the client's electronic banking facility 56. Funds withdrawn by the Parking Authority are acknowledged to be fees for the amount of time each client has spent parking along city streets. The client's electronic banking means 56 used to transact the agreement may take the form of the client's credit card number to which parking fees are to be charged. Various other "debit card" or "smart card" variants are also adequate electronic billing and collection means. Alternatively, the client may authorize the Parking Authority to periodically mail an extract from its database 56 that details the client's parking activity and the resulting parking fees that the client owes to the Municipal Parking Authority.

To improve fee collection performance, the frequency at which the patrol vehicle 50 observes each parked car 60 along the surveillance circuit is increased with respect to that of the "penalty-mode" embodiments described above. For example, if a particular street has a two-hour maximum parking limit, then the parking patrol vehicle 50 would normally return to each parking spot once every two hours (thereby detecting over-parked vehicles liable for a parking citation). However, if the patrol vehicle follows a shorter route such that all vehicles are observed more often (e.g. once every half-hour), then the Epoch-IDs observed for each vehicle provide the information needed measure the period of time that each vehicle has been legally parked. This timing function is the means by which each client's parking bill is computed. The system measures each client's billable parking time in multiples of the patrol vehicle's route repetition frequency. For example, if the system's data capture and processing is fast enough to permit the patrol vehicle to be driven at normal traffic speed, then ten city blocks of high-density parked cars might be observed every 15 minutes. This 15 minute route repetition frequency results in parked cars being charged for each 15 minute period that they remain parked at the same location.

Figure 8:
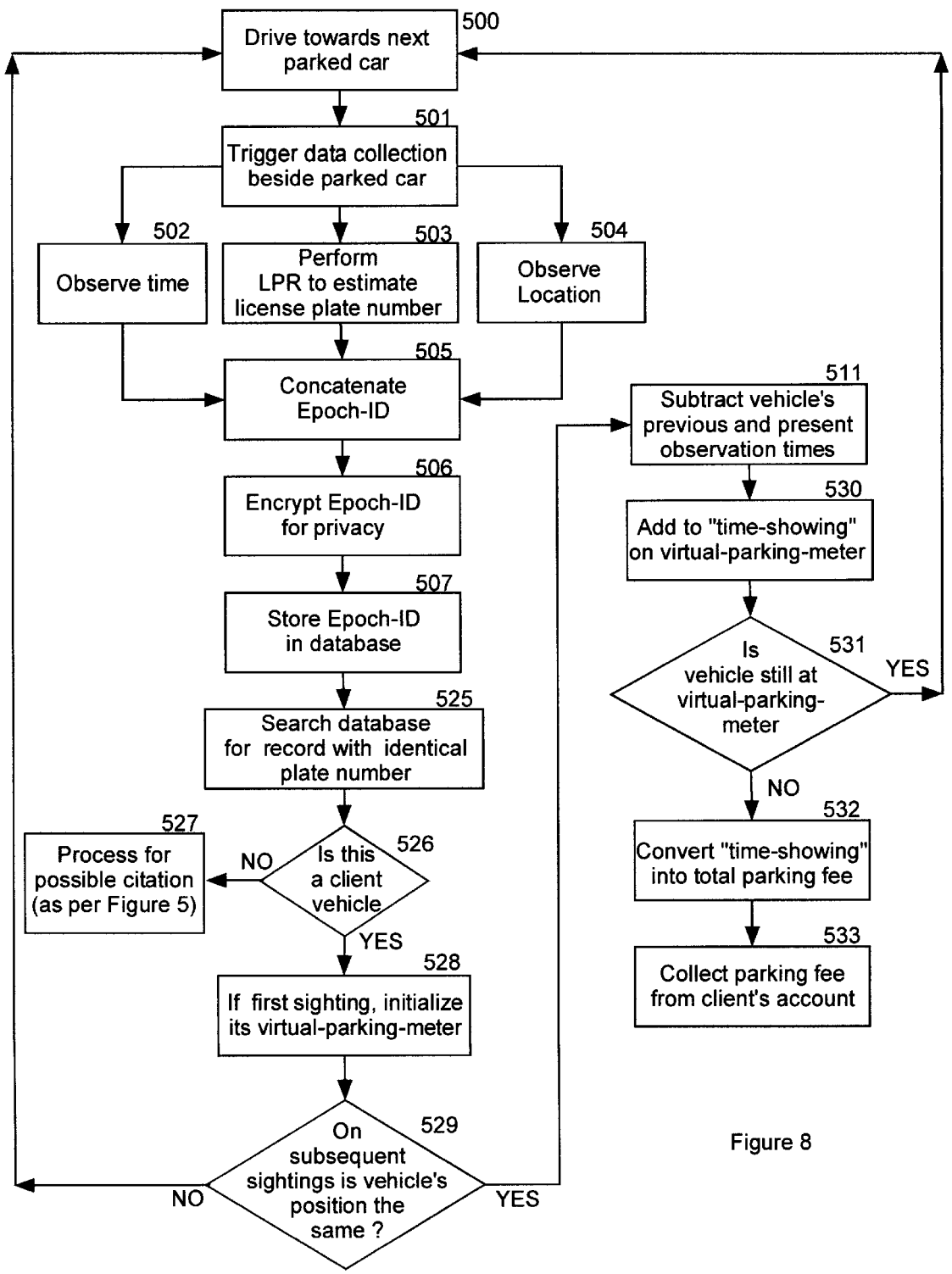
FIG. 8 is a flow chart of the data processing algorithm used by the present invention to determine the amount of money to charge each client vehicle for short-term parking along public streets and collect said funds.

FIGS. 8 is a simplified flow chart illustrating the procedures used to time client vehicles and collect their parking fees. In FIG. 8, data collection and database loading proceed in the same manner as that described above (steps 500 to 507). However, the database search for matching vehicle identities 525 also includes searching a list of vehicle IDs that are clients registered in the system's external bill collection database 56 (in addition to searching through the list of Epoch-IDs that have been previously observed by the system's sensors).

If the database search 525 reveals that the current vehicle is not a registered client, then that vehicle cannot be electronically billed for short-term parking. It must therefore be processed as a potential case for issuing a punitive parking citation. The algorithm therefore branches 527 to the steps flow-charted in FIG. 5 (steps 508 to 517).

In a preferred embodiment, observed vehicles that have not been registered as clients of the system are initially served with a printed warning to do so or be faced with being served a punitive parking citation in the future. Repeated warnings may escalate in their aggressiveness from "polite reminder" to "final notice". The central database maintained by the Parking Authority 56 keeps track of these warning notices and communicates the history to the local database software 113 so that the number of previous warnings can be viewed on-site by the Officer. If the motorist has ignored too many warning notices, then the Officer can elect to serve the vehicle with a punitive parking citation or even impound the vehicle.

If however the database search 525 reveals that the current vehicle is a registered client but that it has not been previously observed by the system's sensors, then a "virtual-parking-meter" is initialized in the database for that vehicle 528. The term "previously" is relative and would typically be limited in scope. Logical limits on the period used to constrain the database search for a "previous" sighting of a particular vehicle might be: "has this vehicle been observed within the previous 12 hours, 24 hours or 48 hours".

Each newly initialize "virtual-parking-meter" is a database record containing the cumulative evidence that a client vehicle has been observed parking at a particular geographic location at a particular time. Each virtual-parking-meter therefore also contains a data field to contain the elapsed "time-showing" since the vehicle was first observed to be parking at that location. The virtual-parking-meter's "time-showing" field is therefore initialize to zero.

On subsequent circuits of the patrol route, each time the patrol vehicle observes the same client vehicle and verifies that it has not moved 529 (i.e. it is still parked at its virtual-parking-meter), the algorithm subtracts the time of the vehicle's previous observation from that of it current observation 511 and adds the resulting period of time to the "time-showing" field of the virtual-parking-meter 530.

If the patrol vehicle's second visit to the location of an existing virtual-parking-meter reveals that the vehicle's unique identifier has changed from that observed on the previous circuit, then the algorithm assumes that the previous occupant was parked for less than the patrol vehicle's observation period (step not illustrated in FIG. 8). Since there are no start and stop observations which evidence the true length of time the previous occupant was parked, the previous occupant's virtual-parking meter is deleted with no time showing on it and no parking fee is charged to its owner's electronic banking means (steps 530, 531 and 532 described below). Alternatively, since the observed evidence does show that the vehicle was parked for at least some fraction of the patrol vehicle's observation period, a minimal "flat-rate" fee is charged to the client's electronic banking means. In either case the virtual-parking-meter is deleted from the database and (if a new tenant vehicle is observed at that location) a new virtual-parking-meter is initialized.

During subsequent circuits of the patrol route, each time the patrol vehicle passes in close proximity to the location of an existing virtual-parking-meter, the identity of its tenant vehicle is observed. If the same vehicle identifier is observed as on the previous circuit 529, then the elapsed time between it previous and current sightings is computed 511. The "time showing" field in that tenant vehicle's virtual-parking-meter is then augmented by the time interval between its previous and current sightings 530. As long as that virtual-parking-meter continues to be occupied 531, new observations of its tenant are made 500 and its "time showing" continues to be augmented by each circuit's duration.

When the patrol vehicle eventually observes that a virtual-parking-meter has been vacated by its tenant vehicle 531, then that virtual-parking-meter's accumulated "time-showing" is transformed into a monetary value 532 based on the fee structure defined in the client's agreement with the Parking Authority (maintained in the Parking Authority's database and available via the data link 56). The accumulated parking fee is then deducted from the client's electronic banking means 533 maintained in the client's Financial Institution's database.

In a preferred embodiment, the parking fee structure charged per unit time is defined so as to encourage motorists to respect the Parking Authority's traffic management priorities. For example, a client parked in a busy commercial district might be charged $0.25 for the first half-hour, $0.50 for the second half-hour, $5.00 for the third half-hour and $20.00 for parking past the local parking limit. This type of non-linear fee structure effectively encompasses the punitive penalty heretofore imposed on vehicles observed parking for long periods in areas where the Parking Authority wants to encourage short-term parking.

Various fee structures may be stored in the database 56 and applied at different times of the day, on different days of the week and in different months of the year. Various fee structures may also be stored and applied to different vehicles based on the location or time of day that they were observed parking. For example, clients who are residents of a particular street may be exempted or charged a reduced fee for overnight parking on their street.

In a preferred embodiment, if an offending vehicle displays a handicap sticker that exempts the vehicle from parking regulations, the system verifies in the database to see if that vehicle is registered to a legitimate handicapped motorist. If fraud is suspected, the Officer may choose to wait for the motorist to return to the vehicle and then take appropriate action.

In a preferred embodiment, if the parked vehicle is registered to a car rental agency, the parking fee is automatically transferred to the car rental agency's electronic banking means so that the fee can be added to their client's rental account.

In a preferred embodiment, out of town or out of state vehicles detected by the system may be issued with a citation thanking them for visiting the municipality and wishing them a pleasant visit.

Linking the sensor data observed by the present invention to an external electronic billing means provides a number of advantages. By automating all transactions, the cost of administering the enforcement system is reduced. Furthermore, direct electronic fund withdrawal renders the enforcement system more resistant to scofflaw motorists. Furthermore, since the present invention reduces the overall cost of parking enforcement, those cost savings can be applied to reduce the total amount each must client pay for on-street parking. Furthermore, the time-consuming tasks of feeding coins into a parking meter (or paying citations for over-parking) are eliminated, thereby providing a more convenient parking experience for each client motorist.

Embodiment That Exploits a Fleet of Public Transit Vehicles

The embodiments described above typically maintain the observed Epoch-IDs in a database that resides on-board each mobile patrol vehicle (i.e. the data link 56 extends no further than the local communication bus 120 and a local mass storage device in the computer 101). The system thereby benefits from the high bandwidth of the communication bus 120 to rapidly search for matching vehicle identifiers in the database of Epoch-IDs. Maintaining the database on-board the mobile vehicle is expedient for detecting parking violations in real-time so that the citations can be printed and immediately served on each offending vehicle.

However, the data link 56 used to store each Epoch-ID and search the database of previously observed Epoch-IDs may also be a high-speed wireless communication link that accesses a remote database. The data link 56 may also be a hardwired link that permits all of the data on-board the patrol vehicles to be uploaded to a central database (typically performed when the patrol vehicles return to a central garage facility at the end of each workday).

Therefore, in a preferred embodiment (not illustrated), each patrol vehicle contributes all of its observed Epoch-IDs to a remote database (by means of either a real-time or post-mission link 56). No attempt is made to serve printed citations on over-parked vehicles therefore no real-time data analysis is required. Data from all patrol vehicles is simply accumulated into a single database for a considerable length of time (typically a full working day). At the end of the working day, all of the data are then batch processed in the Parking Authority's central database. All of the financial transactions resulting from the batch processing are also carried out as a batch process between the Parking Authority's database and the various databases maintained by Financial Institutions named in the parking agreements previously established with each parking client.

The advantage of pooling all data observed by the entire fleet of patrol vehicles is that different patrol vehicle's can be used to observe each of the sequential Epoch-IDs used to augment the "time-showing" on each client's "virtual-parking-meter". Since different patrol vehicles can be used to augment each parked car's virtual-parking-meter, the frequency with which each parked vehicle is observed is effectively increased. For example, a patrol vehicle might traverse a long route that only permits it to observe all parked vehicles once every 2 hours. However, if eight surveillance vehicles patrol that same route (while maintaining approximately equal spacing between them) then each parked car along the route would be observed approximately once every 15 minutes. Concatenating all of the Epoch-IDs observed by all eight patrol vehicles would permit each parked vehicle's virtual-parking-meter to be re-observed and updated once every 15 minutes.

This operational scenario provides significant cost savings when the patrol vehicles used to observe parked cars are Public Transit vehicles such as buses. Each bus is already traversing a pre-defined route as part of its primary function (transporting pedestrians along the bus-route). Each bus also passes in close proximity to all vehicles that are parked along the bus route. If each bus is equipped with the sensors and computing hardware described above, and all of the buses' observe Epoch-IDs as they perform their primary function, then batch processing their data sets will produce revenue from all of the vehicles parked along the route. Motorist parking along the bus routes would thereby effectively subsidize the Public Transit system.

Therefore, in a preferred embodiment, each vehicle in a fleet of patrol vehicles (such as Public Transit vehicles) observes Epoch-IDs and stores them in a central database. The accumulated data is periodically batch-processed such that parking fees are computed for all virtual-parking-meters observed along each route and collected in the manner described above.

Embodiments That Collect Revenue in Private Parking Facilities

Heretofore, owners of off-street parking facilities have been obliged to provide complex and expensive means for collecting parking fees from their clients. Typically, they control access to their private property in order to insure that parking fees are collected. An entry gate is used to prevent vehicles from entering their facility until the motorist has received a time-stamped entry-ticket. A second gate prevents vehicles from exiting the facility without paying the appropriate parking fee. Typically, a cashier at the exit gate collects the parking fees. The cashier receives the motorist's time-stamped entry-ticket, computes the fee corresponding to the time elapsed since the entry-ticket was issued and then lifts the exit gate once the parking fee has been paid by cash transaction. Providing these fee collection means contributes significantly to the operational cost of private parking facilities.

Figure 9:
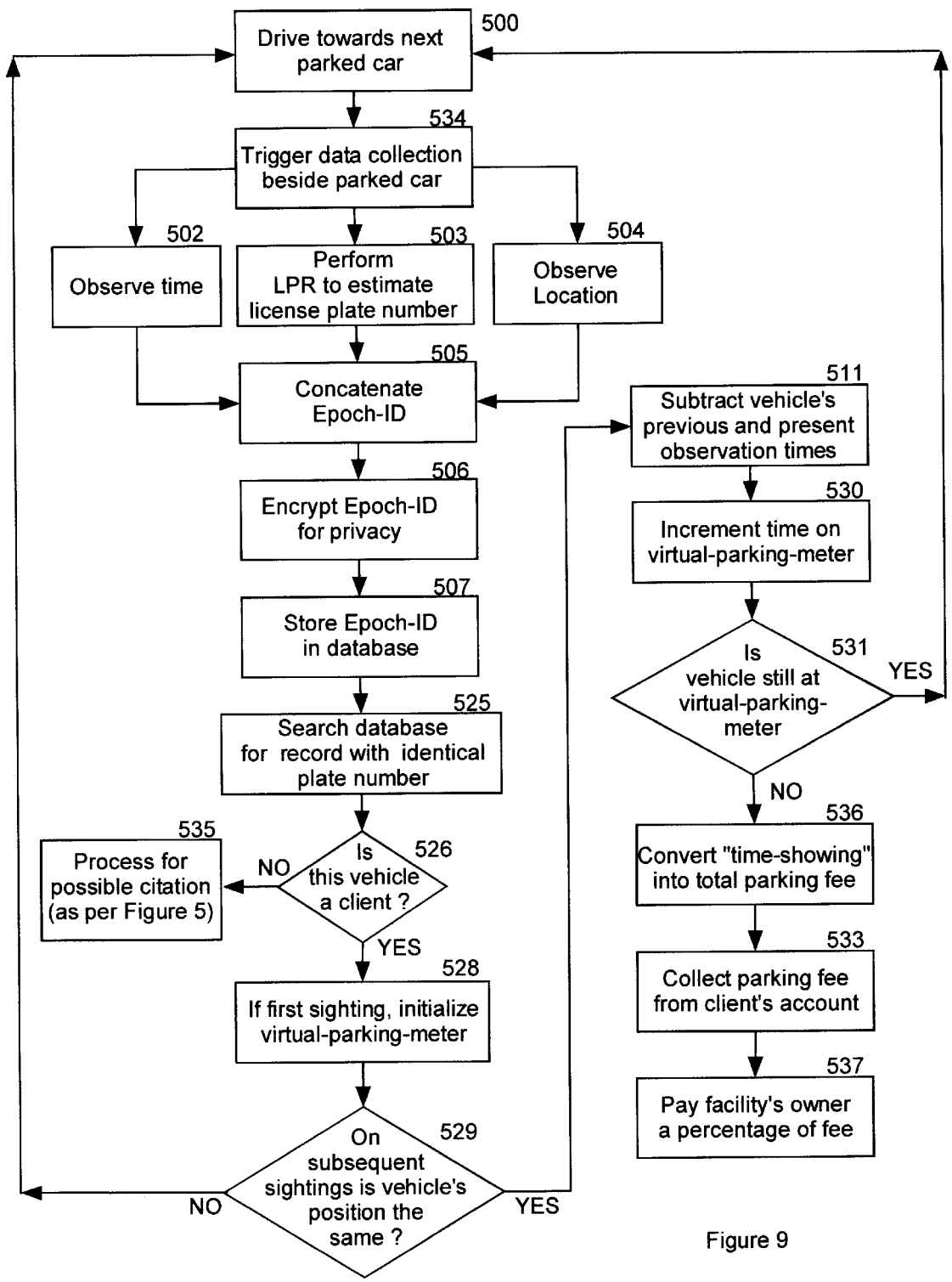
FIG. 9 is a flow chart of the data processing algorithm used by the present invention to determine the amount of money to charge each client vehicle for short-term parking within private off-street parking facilities and collect said funds.

FIG. 9 flow-charts a preferred embodiment of the pre sent invention that significantly reduces the operational cost of private parking facilities. The procedures used by this embodiment are virtually the same as those described above for collecting parking revenues on public streets and illustrated in FIG. 8. When equipped with this embodiment of the present invention, the off-street parking facility does not require any entry or exit controls (i.e. all vehicles are permitted to come and go freely as parking space permits). Furthermore, no personnel are required to be on-site to collect parking fees from clients.

To use this embodiment, an administrative agreement is made between the owner of the parking facility and the municipal Parking Authority. The effect of this agreement is illustrated in step 537. Under the terms of this agreement, parking patrol vehicles owned by the municipal Parking Authority are permitted to extend their on-street enforcement routes through the owner's private parking facility. While the patrol vehicle is operating inside each off-street parking facility, it observes the time each vehicle spends parked at its virtual-parking-meter and determines the time that each client vehicle has been parked at its virtual-parking-meter (using essentially the same algorithm described above and illustrated in FIG. 8). The parking fee determined in step 536 is computed according to the private facility's posted fee structure. The computed parking fees are then charged to each client's electronic banking means 533. The Parking Authority then returns an agreed upon percentage of total revenues to the parking facility's owner 537. The Parking Authority thereby optimizes the productivity of its fleet of patrol vehicles while the cost of operating each off-street parking facility is reduced.

In order to minimize financial losses caused by non-client vehicles parking in the facility, the patrol vehicle may impose more stringent measures against non-client motorists than when non-clients are encountered on public streets 535. For example, the facility's owner might prominently post a sign at the entrance warning all motorists that non-client (i.e. illegitimate) vehicles will be towed away or immobilized. The patrol vehicles would re-observe the number of non-client vehicles in the facility each time it is patrolled. The financial losses caused by illegitimate parking clients would therefore be known at all times and could factored into the revenue sharing agreement with the facility's owner 537. If losses go beyond an acceptable limit, then enforcement activities (towing etc) could be escalated as required. Alternatively, an automated entrance gate could be installed that is controlled by a stationary video camera and LPR surveillance system (not illustrated). Only vehicles that are recognized as clients by the LPR surveillance system would be permitted to proceed past the automated entry gate into the parking facility.

To enable the Parking Authority's patrol vehicles to observe vehicles in off-street facilities, suitable modifications are made to the sensor system used to trigger data collection 534. The camera 51 and triggering mechanism 52 mounted on each patrol vehicle 50 are temporarily modified to compensate for the "side by side" vehicle orientation normally encountered in off-street parking facilities (suitable camera mount and triggering means are described above under' Data Collection"). When a patrol vehicle enters a private parking facility, its operator must temporarily re-position and re-orient the vehicle's camera and triggering mechanisms in order to capture adequate unique vehicle identifiers while operating within the facility.

Similarly, while the patrol vehicle is operated within an enclosed parking facility (above or below ground) its positioning sub-system 53 must be suitably modified to provide adequate geo-referencing capability. For example, since satellite signals will be blocked while operating within the facility, alternate position sensors must be available for establishing and reading the status of each virtual-parking-meter. Inertial sensors, Dead Reckoning sensors (such as differential odometers, flux-gate compass, etc) and map-matching sensors are all suitable technologies for enabling this embodiment. The geo-referencing information is used to determine the location of virtual-parking-meters established within each private parking facility. The Parking Authority can thereby distinguish revenue collected in each private facility from revenue collected on public streets and re-direct the correct amount of money back to the owner each private parking facility.

Embodiment That Provides a Locator Map to Client Motorists

One inconvenience often encountered in large parking facilities is that motorists cannot remember where they parked their cars. This problem is particularly acute in large parking lots at major airports, where motorists often leave their car parked for many days. After returning from their trip, many motorists have difficulty remembering where their car is parked. The present invention provides a solution to this problem by capturing both the location and identity of all vehicles in the parking facility during the course of its patrols. This spatial information can be displayed on a map display (described below) such that a client who cannot remember where their car is parked can see it plotted on a "locator-map" of the parking lot.

Therefore, in a preferred embodiment (not illustrated), the same system used to establish and patrol virtual-parking-meters in a large parking facility is made available for consultation by clients who have lost track of their parked vehicles. Typically, the client motorist goes to a kiosk where the system 101 is visibly located and enters the license plate number of their lost vehicle into the database software 113. The system then uses this criterion to search its database 56, thereby finding Epoch-IDs observed by the patrol vehicle 50 wherein the unique vehicle identifier (determined by LPR) matches their search criterion. The location of their vehicle (contained in the matched Epoch-IDs) is then used to plot their car's position relative to a digital map of the "streets" within the parking facility. The resulting composite image is projected onto the same display device 130 used to provide navigational guidance to the system's operator during data collection activities (described below).

The "locator-map" can also be output on the printer 132, thereby providing the motorist with hardcopy directions of how to find the lost vehicle. This hardcopy might also display a textual summary of the times their vehicle was observed at its virtual-parking-meter, its accumulated "time-showing" and the fee deducted from the client's electronic banking means (i.e. it also acts as the client's purchase receipt).

In parking facilities that are already equipped to collect fees by conventional means (entry/exit gate, time-stamped entry tickets and cashier-booth), the present invention would not normally be required as a means of collecting parking fees. However, the "locator map" function described above might still be considered a valuable enough customer service to warrant use of the present invention. In those facilities, collecting fees from virtual-parking-meters would not be the purpose of the patrols: the "locator map" would be the sole information product produced by the system. Since "time-showing" on "virtual-parking-meters" would not need to be established and continually updated, the frequency of observation patrols could therefore be reduced considerably. For example, instead of a half-hour patrol frequency, a six-hour patrol frequency might be considered adequate for providing locator-maps to clients. Alternatively, the parking lot management might elect to perform more frequent patrols simply as a means of increasing surveillance and improving security for their clients. In the event of theft or vandalism within the facility, the present invention's video record of where and when license plates were observed within the facility would make it useful in deterring crime.

In another preferred embodiment, the "locator-map" function described above is provided to clients on a mobile platform (rather than forcing the clients to make their way to an information kiosk to query the system). The most efficient means of providing this service to the clientele is to permit the operator of a patrol vehicle 50 to interrupt patrol activities at the request of any client. For example, if a client cannot find their parked car, they need only wait for a patrol vehicle to pass nearby whereupon they would hail the driver to stop. The driver would then input the license plate number of the lost vehicle for the client and produce the "locator-map" as described above. If the parked car is a considerable distance away, the driver might elect to transport the passengers to their car, either as a courtesy or as a paid service.

Embodiments That Provide Navigational Guidance to the Operator

In a preferred embodiment, the positioning sub-system 53 used to geo-reference the observed Epoch-IDs also aids the Enforcement Officer to plan and follow an optimal parking patrol route. The planning/guidance means is comprised of a digital map display 130 that uses real-time data from the positioning sub-system 53 to plot the patrol car's changing location onto a digital image of the local street map.

To plan an optimal patrol route, the Officer uses the map display and a computer-pointing device to choose a series of waypoint locations that define a patrol route. The external database used to control the displayed map imagery contains geo-referenced information on the location and name of each street however it may also contain more detailed information such as: direction of one way streets, local speed limits, location of municipal infrastructure etc. Knowledge of the location of municipal infrastructure is used to test if an observed vehicle is parked too close to a fire hydrant, loading zone, driveway etc. The database of such information is commonly referred to as a "Geographic Information System" (GIS). The GIS is accessed by the system's computer 101 and database software 113 by means of the link to external databases 56. Since the GIS information is required in real-time, it will typically be linked from a copy maintained locally on-board the patrol vehicle 50 (since accessing a remote database that would place excessive demands on the data link)

The map database also contains geo-referenced information describing the different parking regulations that apply along each street at different times of the day. Geo-referenced information on local parking regulations is required by the fundamental algorithmic test 513 that is used to flag each parking violation (i.e. "has this car been parked longer than the local parking regulation permits?") In order to answer that question, it's evident that the permitted time limit must be available to the algorithm. The permitted time limit can change abruptly from one location to the next and from one moment to the next. Therefore the permitted parking time limit must be referenced within the database 56 such that the patrol vehicle's position and time can be used to find the appropriate parking time limit for each parked car being tested in step 513.

For violation detection purposes, it's important that the Officer be able to navigate the patrol vehicle 50 along the planned route while closely adhering to a tight schedule. The reason for this timing constraint is that the patrol vehicle must return for the second license plate observation soon after each vehicle has started to violate the local parking limit. If the patrol vehicle returns too early, then the violation alarm will not be triggered (the time difference between the two Epoch-IDs will not trigger the parking violation alarm). If the patrol vehicle returns too late, then real parking infractions will go undetected during the delay. Either way, the system would perform sub-optimally.

Therefore, record keeping and route prediction means are built into the guidance system software 112, which help the Officer plan and follow an optimally timed patrol route. The system continually records and updates a history of ticketing performance and average road speed along each street in the municipality. The system also tracks how ticketing performance varies at different times of the day along each street. This database of historical information is used to compute an estimate for the time it will take to complete any proposed patrol route the operator might define on the moving map display 130. The operator uses this function to interactively plan a route. When in planning mode, the navigation software 112 automatically sums the probable time it will take to follow a proposed route circuit and signals when a proposed circuit provides optimal productivity.

Furthermore, as the chosen route is being followed, the system monitors progress in real-time to see how well the driver is following the schedule (i.e. arriving "just-in-time" for the second license plate observation). Based on how well the planned route schedule is being adhered to, the systems provides suggestions to increase speed, decrease speed or alter the pre-defined route.

The present invention provides a parking regulation enforcement system that can withstand legal challenges. Its inherent legal strength is due to two characteristics.

1) The detection of violations is inherently biased towards the accused motorist's presumption of innocence. Any errors in recognizing a vehicle's unique identity will favour non-detection of a parking violator rather than false accusation. An incorrectly recognized license plate number cannot be flagged as a violation by the algorithm because it won't be able to find a matching Epoch-ID in the database. This bias towards the innocence of violators may result in a small number of real parking violators being missed by the system however it also insures a high probability that all detected parking violators are in fact guilty as charged.

2) Because the reliability of each Epoch-ID's data elements is statistically qualified, the evidence presented in court to corroborate the accusation is demonstrably sound. To add further legal weight to each accusation, the Parking Control Officer can testify to having visually verified that the license plate number recognized by the system was identical to that of the accused vehicle.

The present invention reduces the labor costs involved in enforcing parking regulations. A single patrol vehicle can enforce regulations over a much larger area than is possible when using manual enforcement techniques (i.e. manually marking each vehicle's tires and issuing hand written citations). The productivity gain afforded by the system results in increased revenue for the municipality from the same number of parking enforcement staff Alternatively, the increased enforcement productivity can be used to reduce the punitive fine levied for each parking infraction. The computerized nature of the present invention supports efficient data management through the court system without the requirement to digitize hand-written citation forms. When linked to "electronic banking" means, this centralized data management capability supports the collection of timed "pay per use" fees for short term parking, thereby emulating the functionality of parking meters.

Other Law Enforcement Applications

The data collected for the purpose of parking enforcement also has a number of other law enforcement and public service applications. Each vehicle observed by the system can be searched for in various crime-related databases 56 and if a match is found, the appropriate enforcement authorities can be called in to deal with the situation. Examples of this embodiment are:

1) Identifying legally parked vehicles that have been reported stolen.
2) Identifying legally parked vehicles that should not be on the road (e.g. vehicles registered to drivers whose license is under suspension).
3) Identifying legally parked vehicles whose owners have unpaid public debts (e.g. unpaid traffic fines, child support payments, etc.).
4) Identifying legally parked vehicles that are registered to wanted fugitives.
5) Identifying legally parked vehicles whose owners (convicted felons) may be violating their parole conditions by being parked at a particular location at a particular time.
6) Identifying legally parked vehicles having outstanding liens on them that have resulted in judgments for repossession.

Embodiments of the invention that provide some or all of these additional enforcement functions are similar to the parking control embodiments described in detail above. The only functional modification required to realize these embodiments is to link the system to a database 56 of unique vehicle identifiers that meet the desired law enforcement criteria. For example, if the parking control vehicle drives by a (legally parked) vehicle that is registered to a person having a large number of unpaid traffic fines, the recognized plate-string would be matched to its entry on the "wanted-list" maintained in the database. Any match to data elements on the system's wanted-list would trigger a message to the Enforcement Officer to take appropriate measures (e.g. call in a tow truck that impounds the vehicle until the traffic fines have been paid).

Figure 10:
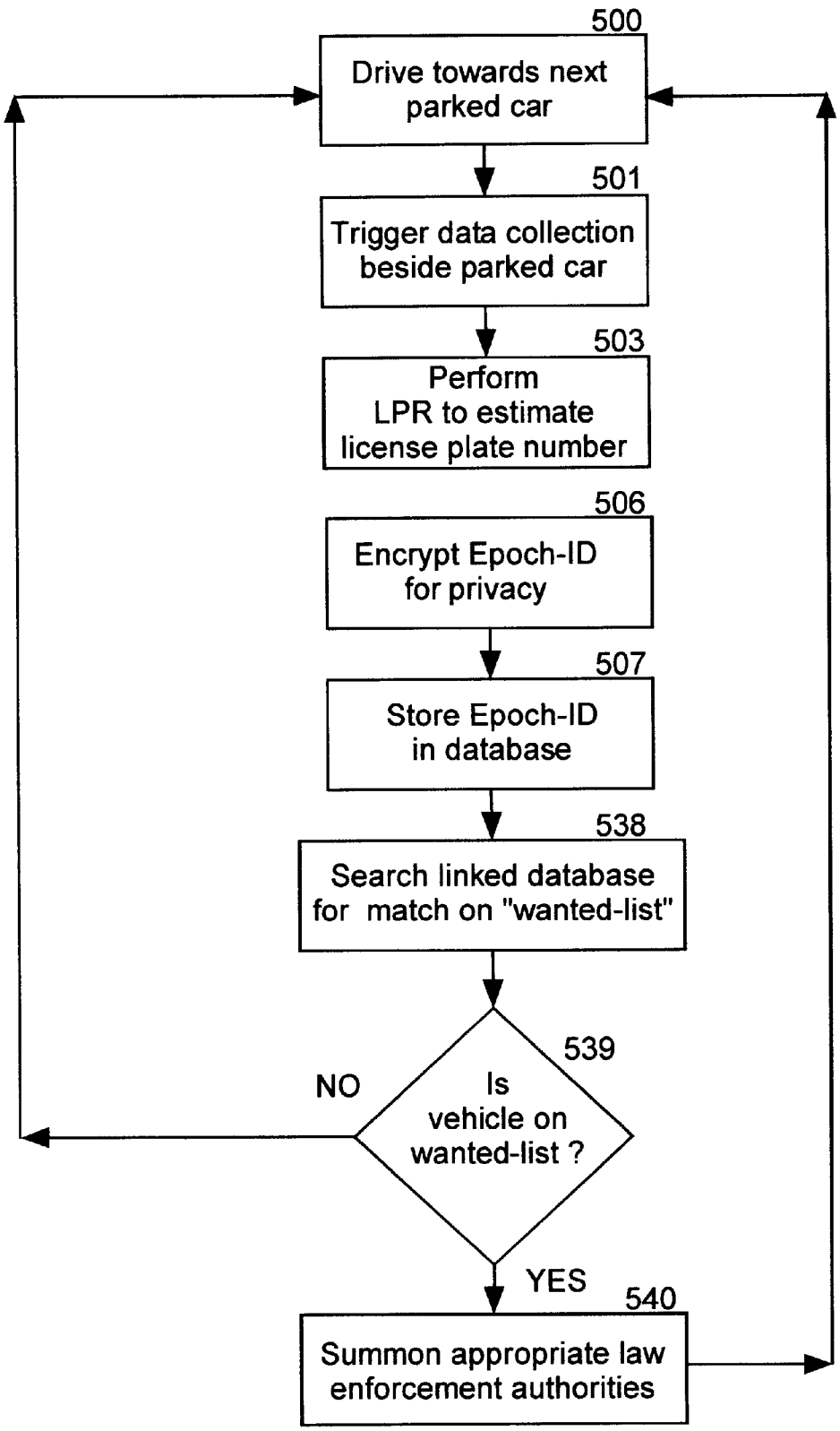
FIG. 10 is a flow chart of the data processing algorithm used by the present invention to find vehicles that are wanted by law enforcement authorities.

FIG. 10 is a flow-chart of a preferred embodiment that searches a "wanted-list" of unique vehicle identifiers maintained in the system's linked database 56. Each unique vehicle identifier is entered on the list only after having been reasonably associated with a person or persons wanted by law enforcement authorities. Each data record stored in the system's linked database 56 also contains instructions on what law enforcement actions are appropriate to take in the event that the vehicle is located. Every time the patrol vehicle 50 observes a new Epoch-ID, the wanted-list is searched for a matching unique vehicle identifier 538. If a match is found 539, then an alarm is sounded and a message is displayed to the Officer providing instructions on what law enforcement actions to take 540.

Typically, the "wanted-list" is updated at the end of each working day when data is downloaded from the patrol vehicle for processing through the Parking Authority's administrative system. However, if there is an urgent requirement to locate a vehicle not already on the wanted-list, that vehicle's unique identifier can be broadcast over a wireless communication link to all parking patrol vehicles. The new wanted vehicle is then immediately added to each patrol vehicle's on-board wanted-list so that the Officers will be automatically alerted if the wanted vehicle is encountered.

Embodiments that support the six enforcement functions listed above can be implemented without the need for geo-referencing hardware 53 and time stamping hardware 55 (that hardware is only required to detect parking violations or to determine the elapsed time that a car has been legally parked at virtual-parking-meter). In a preferred embodiment, the system operates in a "pure search mode" rather than the "parking enforcement modes" described above. FIG. 10 illustrates the algorithm used when operating in the pure search mode. The patrol vehicle makes no attempt to detect parking violations and therefore does not need to return to the same location at any prescribed time interval (i.e. step 500 need not be directed along any pre-defined route). This embodiment must uniquely identify each vehicle based on a single observation and must therefore employ either Full Recognition Mode LPR, or an active vehicle identification means such as transponders.

Since parking regulations are not being enforced in pure search mode, the plate-strings or transponder IDs recognized by the system need not be geo-referenced or time-stamped. Patrol vehicles operating in pure search mode simply drive about the municipality identifying all parked vehicles. As each parked vehicle is identified, it is searched for in the linked database's "wanted list" 538. If a matching vehicle ID is found in the database 539, then an alarm is sounded that alerts the driver to take the pre-defined law enforcement action 540. This simpler embodiment of the present invention would typically be mounted on public vehicles that patrol streets in a random fashion during the course of carrying out other public functions (e.g. police cars, ambulances, road maintenance vehicles, etc.).

Embodiment That Insures the Privacy of Citizens

The present invention's ability to identify the whereabouts of individual motorists raises concerns that the information could be used to invade the privacy of citizens. Therefore, in a preferred embodiment, all data collected during the course of enforcing parking regulations is encrypted (shown as step 506 in FIGS. 5 through 10). The encryption algorithm used may be one of many that are commonly used to assure the privacy and security of sensitive information (e.g. financial transaction data transmitted over the Internet). This encryption step insures that the data remains unintelligible in the event that it falls into unauthorized hands. For example, the Parking Enforcement Officers that use the system should only be permitted to see data pertinent to vehicles that have triggered a parking violation alarm. All other observed data should remain unintelligible to the Officer and no unencrypted digital data files should be downloadable from the system without adequate security clearance. Access to unencrypted data is restricted to duly appointed Public Authorities on a "need to know" basis. Typically a court order would be required to gain access to the de-encryption key needed to search through Epoch-IDs that have been observed by the system.

What is claimed is:

1. A parking regulation enforcement system for monitoring a parked vehicle, the system comprising:

a camera capturing a first image of the parked vehicle at a first observation time and a second image of the vehicle at a second observation time;

a data processing sub-system coupled to the camera, the data processing sub-system extracting an identifier of the parked vehicle from the first image and the second image;

means, within the data processing sub-system, for determining a first position of a predetermined measurement point at the first observation time and a second position of the measurement point at the second observation time, the means comprising a global positioning system;

a memory within the data processing sub-system, the memory storing a first data record, the first data record comprising the identifier, the first observation time, and the first position of the measurement point; and means, within the data processing sub-system, for comparing the first data record to a second data record, the second data record including the identifier, the second observation time, and the second position of the measurement point, and for generating an output.

2. The parking regulation enforcement system, as recited in claim 1, further comprising:

a proximity sensor coupled to the data processing sub-system, the sensor measuring a distance between the parked vehicle and the measurement point;

means for triggering the camera to capture the first and second images when the measured distance is equal to a predetermined value.

3. The parking regulation enforcement system, as recited in claim 1, further comprising:

a metal detector coupled to the camera;

means for triggering the camera to capture the first and second images when the metal detector detects a predetermined amount of metal.

4. The parking regulation enforcement system, as recited in claim 1, wherein the identifier is a license plate number of the parked vehicle.

5. The parking regulation enforcement system, as recited in claim 4, wherein the sub-system uses a pattern-matching license plate recognition algorithm to extract the license plate number from the first image and the second image.

6. The parking regulation enforcement system, as recited in claim 4, wherein the sub-system uses a full recognition mode license plate recognition algorithm to extract the license plate number from the first image and the second image.

7. The parking regulation enforcement system, as recited in claim 4, wherein the sub-system uses a pattern matching license plate recognition algorithm and a full recognition mode license plate algorithm to extract the license plate number from the first image and the second image.

8. The parking regulation enforcement system, as recited in claim 1, further comprising a radio frequency transponder coupled to the parked vehicle, the transponder broadcasting the identifier when interrogated.

9. The parking regulation enforcement system, as recited in claim 1, further comprising a display coupled to the camera, the display showing the first image and the second image.

10. The parking regulation enforcement system, as recited in claim 1, wherein the camera is mounted on a second vehicle.

11. The parking regulation enforcement system, as recited in claim 10, wherein the measurement point is a location on the second vehicle.

12. A system for locating a lost vehicle comprising;
    a sensor capturing an image of the lost vehicle at an observation time;
    a sub-system, within a data processing system coupled to the sensor, the sub-system extracting an identifier of the lost vehicle from the image;
    a positioning system, coupled to the data processing system, for determining a position of a predetermined measurement point at the observation time;
    a concatenation system for concatenating the identifier, the observation time, and the position of the measurement point into a vehicle data record;
    a display device coupled to the data processing system for displaying a location of the lost vehicle on the display device;
    a database coupled to the data processing system, the database storing a plurality of data records, each data record including a vehicle identifier, the observation time, and a vehicle position; and
    a search engine coupled to the database for enabling a user to traverse the database to locate a second data record having the identifier of the lost vehicle, to assist in identifying the lost vehicle.

13. A parking regulation enforcement system for monitoring a parked vehicle, the system comprising:
    a camera capturing an image of a vehicle at a first observation time;
    a data processing sub-system coupled to the camera, the data processing sub-system extracting an identifier of the vehicle from the image;
    means, within the data processing sub-system, for determining a position of a predetermined measurement point at the first observation time;
    means for concatenating the identifier, the first observation time, and the position of the measurement point into a vehicle data record;
    a database coupled to the data processing sub-system, the database storing a plurality of data records, each data record including a vehicle identifier, an observation time and a vehicle position;
    means for traversing the database to locate a second data record having the identifier of the vehicle; and
    a computerized billing system for receiving data, and for creating an output.

14. The parking regulation enforcement system, as recited in claim 13, further comprising:
    first means for comparing the observation time in the first data record to the observation time of the second data record; and
    second means for comparing the position in the first data record to the position in the second data record.

15. The parking regulation enforcement system, as recited in claim 14, further comprising third means for comparing a difference between the observation time in the first data record and the observation time of the second data record to a predetermined parking time limit.

16. The parking regulation enforcement system, as recited in claim 15, further comprising the computerized billing system, the billing system receiving data from the first and second comparing means.

17. The parking regulation enforcement system, as recited in claim 16, wherein the computerized billing system measures an overall parking time of the vehicle over a predetermined period of time.

18. The parking regulation enforcement system, as recited in claim 16, wherein the computerized billing system initializes a virtual parking meter in the database, the virtual parking meter comparing a plurality of data records for a particular vehicle.

19. The parking regulation enforcement system, as recited in claim 16, wherein the computerized billing system charges a fee to an owner of the vehicle based upon a fee structure.

20. The parking regulation enforcement system, as recited in claim 19, wherein the fee structure is based on a changing hourly rate.

21. The parking regulation enforcement system, as recited in claim 13, further comprising:
    a parking facility system for determining a parking fee within a parking facility, the system determining a parking fee by comparing the observation time in the first data record to the observation time in the second data record.

22. The parking regulation enforcement system, as recited in claim 21, further comprising an automated gate coupled to the parking facility system that blocks movement of the vehicle based upon data received from the parking facility system.

23. The parking regulation enforcement system, as recited in claim 13, further comprising a second database storing geographically referenced information.

24. The parking regulation enforcement system, as recited in claim 23, further comprising:
    a navigation system that records and updates a plurality of citations for vehicles based on the plurality of stored data records;
    means for estimating a time for patrolling a route based on the plurality of citations and geographic information to estimate the time.

25. The parking regulation enforcement system, as recited in claim 24, further comprising a display displaying information stored in the second database.

26. The parking regulation enforcement system, as recited in claim 13, further comprising a clock within the data processing sub-system.

27. The parking regulation enforcement system, as recited in claim 13, wherein the identifier is a license plate number of the vehicle.

28. The parking regulation enforcement system, as recited in claim 27, wherein the sub-system uses a license plate recognition algorithm to extract the license plate number from the image.

29. The parking regulation enforcement system, as recited in claim 28, further comprising means for comparing a result of the license plate recognition algorithm to a predetermined threshold.

30. The parking regulation enforcement system, as recited in claim 28, wherein the vehicle data record further includes the raster image.

31. The parking regulation enforcement system, as recited in claim 13, further comprising means for estimating an error in the position of the vehicle, the estimated error being stored in the vehicle data record.

32. The parking regulation enforcement system, as recited in claim 13, further comprising:
a second database storing a plurality of vehicle identifiers;
means for traversing the second database to locate one of the vehicle identifiers matching the identifier in the vehicle data record;
means for notifying a user of a located match between the vehicle identifier and the identifier in the vehicle data record.

33. The parking regulation enforcement system, as recited in claim 13, further comprising means for encrypting the vehicle data record.

34. The parking regulation enforcement system, as recited in claim 13, wherein the camera captures a plurality of successive images of the vehicle.

35. The parking regulation enforcement system, as recited in claim 13, further comprising a second camera capturing an image of a second vehicle.

36. A system for locating a lost vehicle comprising;
a camera capturing an image of the lost vehicle at an observation time;
a sub-system, within a data processing system coupled to the camera, the sub-system extracting an identifier of the lost vehicle from the image;
means, coupled to the data processing system, for determining a position of a predetermined measurement point at the observation time;
means for concatenating the identifier, the observation time, and the position of the measurement point into a vehicle data record;
a database coupled to the data processing system, the database storing a plurality of data records, each data record including a vehicle identifier, the observation time, and a vehicle position; and
means for enabling a user to traverse the database to locate a second data record having the identifier of the lost vehicle, to assist in identifying the lost vehicle.

37. The system for locating a lost vehicle as recited in claim 36, further comprising:
a display device coupled to the data processing system; and
means for plotting a location of the lost vehicle on the display device.

38. The system for locating a lost vehicle, as recited in claim 36, wherein the enabling means is mobile.

39. A method for enforcing parking regulations comprising:
capturing an image of a parked vehicle at a first observation time;
extracting an identifier of the parked vehicle from the image;
determining a position of a predetermined measurement point at the first observation time;
concatenating the identifier, the first observation time, and the position of the measurement point into a vehicle data record;
storing a plurality of data records, each data record including a vehicle identifier, an observation time, and a vehicle position;
traversing the database to locate a second data record having the identifier of the parked vehicle; and
billing a customer based upon a billing criteria and the stored data records.

40. The method for enforcing parking regulations, as recited in claim 39, further comprising the steps of:
comparing the observation time in the first data record to the observation time of the second data record; and
comparing the position in the first data record to the position in the second data record.

41. A parking regulation enforcement system for monitoring a parked vehicle, the system comprising:
a sensor for capturing a first image of the parked vehicle at a first observation time and a second image of the vehicle at a second observation time;
a data processing sub-system coupled to the sensor, the data processing sub-system extracting an identifier of the parked vehicle from the first image and the second image;
a global positioning system within the data processing sub-system, for determining a first position of a predetermined measurement point at the first observation time and a second position of the measurement point at the second observation time;
a memory within the data processing sub-system, the memory storing a first data record, the first data record comprising the identifier, the first observation time, and the first position of the measurement point; and
a comparator within the data processing sub-system, for comparing the first data record to a second data record, the second data record including the identifier, the second observation time, and the second position of the measurement point, and for generating an output.

42. A parking regulation enforcement system for monitoring a parked vehicle, the system comprising:
a sensor for capturing an image of a vehicle at a first observation time;
a data processing sub-system coupled to the sensor, the data processing sub-system extracting an identifier of the vehicle from the image;
a positioning sub-system, within the data processing sub-system, for determining a position of a predetermined measurement point at the first observation time;
a concatenation system for concatenating the identifier, the first observation time, and the position of the measurement point into a vehicle data record;
a database coupled to the data processing sub-system, the database storing a plurality of data records, each data record including a vehicle identifier, an observation time and a vehicle position;
a search engine coupled to the database for traversing the database to locate a second data record having the identifier of the vehicle; and
a computerized billing system for receiving data, and for creating an output.

* * * * *